US012605716B2

(12) United States Patent　　　　(10) Patent No.: US 12,605,716 B2
Hotte et al.　　　　　　　　　　　　(45) Date of Patent: Apr. 21, 2026

(54) ORGANIC WASTE PROCESSING DEVICE AND METHOD

(71) Applicant: TERO INNOVATION INC., Quebec (CA)

(72) Inventors: Denis Hotte, L'Ancienne-Lorette (CA); Hugues Gagnon, Pont-Rouge (CA); Valerie Laliberte, Val-D'Or (CA); Elizabeth Coulombe, Quebec (CA)

(73) Assignee: BIGZ TECH INC., Montreal (CA)

( * ) Notice: Subject to any disclaimer, the term of this patent is extended or adjusted under 35 U.S.C. 154(b) by 678 days.

(21) Appl. No.: 17/913,073

(22) PCT Filed: Mar. 19, 2021

(86) PCT No.: PCT/CA2021/050367
　§ 371 (c)(1),
　(2) Date: Sep. 20, 2022

(87) PCT Pub. No.: WO2021/184127
　PCT Pub. Date: Sep. 23, 2021

(65) Prior Publication Data
　US 2023/0142555 A1　　May 11, 2023

Related U.S. Application Data

(60) Provisional application No. 62/992,473, filed on Mar. 20, 2020.

(51) Int. Cl.
　*B02C 18/00*　　　(2006.01)
　*B02C 18/08*　　　(2006.01)
　(Continued)

(52) U.S. Cl.
　CPC .......... *B02C 18/0092* (2013.01); *B02C 18/08* (2013.01); *B02C 23/26* (2013.01);
　(Continued)

(58) Field of Classification Search
　CPC . B02C 18/0092; B02C 18/08; B02C 18/0084; B02C 18/12; B02C 23/26;
　(Continued)

(56) References Cited

U.S. PATENT DOCUMENTS 5,925,321 A　　7/1999　Koyamoto et al.
8,727,251 B2　　5/2014　Loos et al.
(Continued)

FOREIGN PATENT DOCUMENTS

CN　　104668061 A　　6/2015
CN　　111285709 A　　6/2020
(Continued)

OTHER PUBLICATIONS

International Search Report and Written Opinion for priority application No. PCT/CA2021/050367 dated Jun. 1, 2021, 7p.
(Continued)

*Primary Examiner* — Jared O Brown
*Assistant Examiner* — Teresa A Guthrie
(74) *Attorney, Agent, or Firm* — Decode Legal Inc.; Charles-Andre Caron; Irina Kostko

(57) ABSTRACT

An organic waste processing device comprising: an organic matter-receiving container defining an organic matter-receiving chamber; a gas-propelling unit; a gas-plenum chamber in gas communication with the gas-propelling unit; and a grinding assembly at least partially contained in the organic matter-receiving chamber. The grinding assembly comprises a drive shaft and a rotatable blade assembly including a blade support sleeve mounted to the drive shaft and being engaged in rotation therewith. The rotatable blade assembly further includes at least one blade mounted to the blade support sleeve. An inner surface of the blade support sleeve is spaced-apart from an outer peripheral surface of the drive shaft to define a gas flow channel extending longitu-
(Continued)

dinally into the griding assembly and providing gas communication between the gas-plenum chamber and the organic matter-receiving chamber.

19 Claims, 16 Drawing Sheets

(51) Int. Cl.

| | |
|---|---|
| *B02C 23/26* | (2006.01) |
| *B09B 3/35* | (2022.01) |
| *B09B 3/40* | (2022.01) |
| *B09B 101/25* | (2022.01) |
| *B09B 101/70* | (2022.01) |
| *C05F 9/02* | (2006.01) |

(52) U.S. Cl.
CPC .................. *B09B 3/35* (2022.01); *B09B 3/40* (2022.01); *C05F 9/02* (2013.01); *B02C 2201/066* (2013.01); *B09B 2101/25* (2022.01); *B09B 2101/70* (2022.01)

(58) Field of Classification Search
CPC ......... B02C 23/28; B02C 23/34; B02C 23/24; B02C 2201/06; B02C 2201/063; B02C 2201/066; B09B 3/40; B09B 3/35; B09B 2101/25; B09B 2101/70; C05F 9/02; Y02W 30/40; Y02W 30/52; A61L 11/00
USPC ......................................................... 241/18
See application file for complete search history.

(56) References Cited

U.S. PATENT DOCUMENTS

| | | | |
|---|---|---|---|
| 9,308,535 | B2 | 4/2016 | Delgado et al. |
| 9,409,180 | B2 | 8/2016 | Ali |
| D787,259 | S | 5/2017 | Chung |
| D790,145 | S | 6/2017 | Chen |
| D806,974 | S | 1/2018 | Lloyd et al. |
| D809,729 | S | 2/2018 | Chen |
| D816,995 | S | 5/2018 | Fleming et al. |
| D818,712 | S | 5/2018 | Fleming et al. |
| 10,000,429 | B2* | 6/2018 | Maghas .................. C05F 17/60 |
| 10,035,734 | B2 | 7/2018 | Koh |
| D836,968 | S | 1/2019 | Chung et al. |
| 10,590,046 | B2 | 3/2020 | Buzruk et al. |
| D886,510 | S | 6/2020 | Zhang et al. |
| D887,198 | S | 6/2020 | Zhao et al. |
| D891,719 | S | 7/2020 | Sponder et al. |
| 10,723,666 | B2 | 7/2020 | Maghas et al. |
| D900,422 | S | 10/2020 | Joseph |
| D903,217 | S | 11/2020 | Smeets |
| 10,906,847 | B2 | 2/2021 | Buzruk et al. |
| D938,125 | S | 12/2021 | Zhang |
| D939,174 | S | 12/2021 | Zeng |
| D965,940 | S | 10/2022 | Zeng |
| 2013/0075503 | A1* | 3/2013 | Chen ................... B02C 18/0084 241/17 |
| 2016/0207845 | A1 | 7/2016 | Delgado et al. |
| 2018/0029948 | A1 | 2/2018 | Atkinson et al. |
| 2019/0084896 | A1* | 3/2019 | Scott .................. B01F 23/2331 |
| 2020/0353474 | A1* | 11/2020 | Crepeau ................ B02C 18/12 |
| 2023/0003449 | A1 | 1/2023 | Pei et al. |

FOREIGN PATENT DOCUMENTS

| | | |
|---|---|---|
| CN | 211946843 U | 11/2020 |
| CN | 211946845 U | 11/2020 |
| CN | 211946846 U | 11/2020 |
| CN | 211948722 U | 11/2020 |
| CN | 212069887 U | 12/2020 |
| CN | 113582735 A | 11/2021 |
| CN | 217491103 U | 9/2022 |
| JP | 2010-075822 A | 4/2010 |
| JP | 5141511 B2 | 2/2013 |
| KR | 10-1329545 B1 | 11/2013 |
| KR | 10-1452911 B1 | 10/2014 |

OTHER PUBLICATIONS

Terro, www.teroinnovation.com, Sep. 22, 2021, Internet: https://teroinnovation.com/collections/products/products/tero?variant=40668411756711, 1p.

Tero, "A Green Revolution on Every Countertop—The Canadian company is launching across Canada as production is ramping up", www.newsire.ca, Apr. 21, 2021, Internet: https://www.newsire.ca/news-releases/tero-a-green-revolution-on-every-countertop-the-canadian-company-is-launching-across-canada-as-production-is-ramping-up-834787192.html, 2p.

Tero,"Production's Behind the Scene", Tero, www.youtube.com, Jun. 22, 2021, Internet: https://www.youtube.com/watch?v=13srjQVm25o, 3p.

Tero, "L'appareil qui révolutionne le compostage", www.youtube.com, Dec. 18, 2020, Internet: https://www.youtube.com/watch?v=uGinba8EMRQ, 3p (machine translated subtitles available at youtube).

\* cited by examiner

ORGANIC WASTE PROCESSING DEVICE AND METHOD

CROSS-REFERENCE TO RELATED APPLICATIONS

This application is a national phase application of International Patent Application No. PCT/CA2021/050367, filed on Mar. 19, 2021, which claims priority under 35USC § 119(e) of U.S. provisional patent application 62/992,473 filed on Mar. 20, 2020. The entireties of the above applications are hereby incorporated by reference.

TECHNICAL FIELD

The present invention relates to the field of organic waste processing. More particularly, the invention relates to an organic waste processing device that dries and grinds organic waste into a convenient particular form, such as a fertilizing material including plant growth supplements. It also relates to a method for processing organic waste, including grinding and drying same to obtain a fertilizing particular material.

BACKGROUND

It is a clear desire of many people to do more for the environment by reducing our ecological footprint. For instance, it is well-known that composting offers an environmental alternative to using organic material for landfill because, amongst others, composting reduces methane production, a major source of greenhouse gas.

However, city-owned composting facilities are not available everywhere and few cities offer composting facilities. Furthermore, transporting organic waste towards composting facilities has a non-negligible cost because organic matter is typically heavy and bulky and this adds to the ecological footprint.

In addition, composting at home is not always possible, especially when one does not have a backyard. Furthermore, it can be rebarbative to some because it can be smelly, it requires additional work to gather up the kitchen waste and put in a compost pile outside after meals.

There is thus a need for a domestic appliance which would transform domestic organic waste in a few hours, which could be substantially odorless and silent, and which could transform the food residue into a valuable fertilizer for plants and garden.

In view of the above, there is a need for an improved organic waste processing device which, by virtue of its design and components, would be able to overcome or at least minimize some of the above-discussed prior art concerns.

SUMMARY

According to a first general aspect, there is provided an organic waste processing device comprising: an organic matter-receiving container having a bottom wall and a peripheral wall extending from the bottom wall and defining together an organic matter-receiving chamber; at least one grinding assembly at least partially contained in the organic matter-receiving chamber, and a gas-propelling unit.

In an embodiment, each one of the at least one grinding assembly comprises: a drive shaft having an interior (or inner) gas flow channel extending longitudinally therethrough and an outer peripheral surface; and a rotatable blade assembly including a blade support sleeve mounted to the drive shaft and being engaged in rotation therewith. The blade support sleeve has a sleeve outer peripheral surface and the rotatable blade assembly further includes at least one blade mounted to the blade support sleeve and extending outwardly from the sleeve outer peripheral surface into the organic matter-receiving chamber. The drive shaft and the blade support sleeve are in fluid communication and configured to define at least one gas path to provide gas flow flowing from the interior gas flow channel of the drive shaft into the organic matter-receiving chamber. The gas-propelling unit is in gas communication with the interior gas flow channel of the drive shaft.

More particularly, when mounted to the drive shaft, the blade support sleeve is configured to define at least one gas path to provide gas flow flowing from the interior gas flow channel of the drive shaft into the organic matter-receiving chamber. More particularly, an interior surface of the blade support sleeve is spaced-apart from the drive shaft.

In an alternative embodiment, the drive shaft is free of interior gas flow channel and the at least one gas path is provided between the drive shaft and a partition wall and/or the drive shaft and the inner surface of the blade support sleeve and/or the inner surface of the blade support sleeve and a partition wall. In an embodiment, the at least one gas path comprises an ascending gas flow and/or a descending gas flow.

In an embodiment, the organic waste processing device further comprises a heating unit configured to heat organic waste contained in the organic matter-receiving chamber. The heating unit can comprise a gas-heating unit configured to heat gas propelled by the gas-propelling unit before it contacts the blade support sleeve. In an embodiment, the organic waste contained in the organic matter-receiving chamber is heated at least by convection with heated gas flowing through the at least one grinding assembly. In an embodiment, the organic waste can be also heated by convection via the bottom wall of the organic matter-receiving container.

In an embodiment, the blade support sleeve covers a section of the drive shaft extending in the organic matter-receiving chamber with an inner surface of a peripheral wall of the blade support sleeve being at least partially spaced-apart from the outer peripheral surface of the drive shaft to define a gas flow channel inbetween, the gas flow channel being in gas communication with a gas-plenum chamber of the organic waste processing device. In an embodiment, the gas flow channel is an outer gas flow channel in gas communication with the interior gas flow channel of the drive shaft, if any. The peripheral wall of the drive shaft can comprise at least one aperture defined therethrough to provide gas communication between the interior gas flow channel of the drive shaft and the outer gas flow channel.

In an embodiment, the gas flow channel defined in the at least one grinding assembly is in gas communication with the organic matter-receiving chamber at least through a spacing defined between a lower end of the peripheral wall of the blade support sleeve and the bottom wall of the organic matter-receiving container.

According to another general aspect, there is also provided an organic waste processing device comprising an organic matter-receiving container having a bottom wall and a peripheral wall extending from the bottom wall and defining together an organic matter-receiving chamber; and at least one grinding assembly at least partially contained in the organic matter-receiving chamber and having a longitudinal axis. Each one of the at least one grinding assembly

3

4 comprises: a drive shaft; and a rotatable blade assembly including a blade support sleeve mounted to the drive shaft and being engaged in rotation therewith. The blade support sleeve has a sleeve outer peripheral surface and at least two rows of at least one blade mounted to the blade support sleeve and extending outwardly from the sleeve outer peripheral surface into the organic matter-receiving chamber. The at least two rows of at least one blade are longitudinally spaced-apart from one another.

According to yet another general aspect, there is also provided a method for grinding and drying waste organic matter. The method comprises the steps: adding waste organic matter into an organic matter-receiving chamber; and simultaneously grinding the waste organic matter by engaging in rotation at least one grinding assembly having at least one blade mounted thereon and drying the waste organic matter while it is grinded by injecting gas into the organic matter-receiving chamber through the at least one grinding assembly. The method can further comprise heating the gas before injecting same into the organic matter-receiving chamber.

According to a general aspect, there is provided an organic waste processing device comprising: a casing, an organic matter-receiving container, a gas-propelling unit, and at least one grinding assembly. The casing includes a base and a peripheral wall, extending upwardly from the base, and defining together an internal compartment. The casing has a gas-plenum chamber defined therein. The organic matter-receiving container is insertable in the internal compartment of the casing and has a bottom wall and a peripheral wall extending from the bottom wall and defining together an organic matter-receiving chamber. The gas-propelling unit is in gas communication with the gas-plenum chamber. The at least one grinding assembly is at least partially contained in the organic matter-receiving chamber. Each one of the at least one grinding assembly comprises: a drive shaft having an outer peripheral surface; and a rotatable blade assembly including a blade support sleeve mounted to the drive shaft and being engaged in rotation therewith, said blade support sleeve having a peripheral wall with an inner surface and a sleeve outer peripheral surface and the rotatable blade assembly further includes at least one blade mounted to the blade support sleeve and extending outwardly from said sleeve outer peripheral surface into the organic matter-receiving chamber, the inner surface of the blade support sleeve being spaced-apart from the outer peripheral surface of the drive shaft to define at least one gas flow channel extending longitudinally into the at least one griding assembly and providing gas communication between the gas-plenum chamber and the organic matter-receiving chamber.

In an embodiment, the organic waste processing device further comprises a heating unit configured to heat organic waste contained in the organic matter-receiving chamber.

In an embodiment, the organic matter-receiving container is removably insertable in the internal compartment of the casing with the bottom wall of the organic matter-receiving container being spaced-apart from the base of the casing to define the gas-plenum chamber inbetween and in gas communication with the gas-propelling unit and the at least one gas flow channel of the at least one grinding assembly, the gas-propelling unit generating a gas flow from the gas-plenum chamber towards the organic matter-receiving container and through the at least one gas flow channel of the at least one grinding assembly.

In an embodiment, the organic waste processing device further comprises a gas-heating unit at least partially contained in the gas-plenum chamber and configured to heat gas propelled by the gas-propelling unit while flowing into the gas-plenum chamber. The gas-heating unit can comprise at least one heating element contained at least partially in the gas-plenum chamber. The gas-heating unit can comprise a partition wall located in the gas-plenum chamber and surrounding at least partially the at least one heating element; and a plurality of fins dividing the gas flow to enhance heat transfer with the at least one heating element.

In an embodiment, the gas-propelling unit circulates the gas flow along a gas flow path defined in the organic waste processing device, the gas flow path including sequentially the gas-plenum chamber, the at least one gas flow channel extending longitudinally into the at least one griding assembly, and the organic matter-receiving chamber, wherein the organic waste processing device further comprises a gas-filtering assembly mounted downstream of the organic matter-receiving container in the gas flow path. In an embodiment, the organic waste processing device further comprises a lid engageable with the casing and containing the gas-filtering assembly.

In an embodiment, the at least one gas flow channel comprises an ascending gas flow channel and a descending gas flow channel. The descending gas flow channel can surround the ascending gas flow channel with a partition wall extending inbetween. The partition wall can comprise a peripheral wall of the drive shaft defining a gas port opened in the gas-plenum chamber. The peripheral wall of the drive shaft can comprise at least one aperture extending therethrough to provide gas communication between the ascending gas flow channel and the descending gas flow channel. The at least one aperture can be located in an upper section of the peripheral wall of the drive shaft.

The drive shaft can be located centrally inside the ascending gas flow channel and the partition wall can surround the drive shaft and be spaced-apart thereof with the ascending gas flow channel extending inbetween. The ascending gas flow channel and the descending gas flow channel can be in fluid communication above an upper free end of the partition wall. The partition wall can comprise a tubular shell extending upwardly from the bottom wall of the organic matter-receiving container to prevent organic matter contained in the organic matter-receiving chamber from entering into the gas-plenum chamber.

The ascending gas flow channel and the descending gas flow channel can be in gas communication in an upper section of the at least one grinding assembly.

In an embodiment, the at least one gas flow channel comprises an inner gas flow channel and an outer gas flow channel. The outer gas flow channel can surround the inner gas flow channel with a partition wall extending inbetween. The partition wall can comprise a peripheral wall of the drive shaft defining a gas port opened in the gas-plenum chamber. The peripheral wall of the drive shaft can comprise at least one aperture extending therethrough to provide gas communication between the inner gas flow channel and the outer gas flow channel. The at least one aperture can be located in an upper section of the peripheral wall of the drive shaft.

The drive shaft can be located centrally inside the inner gas flow channel and the partition wall can surround the drive shaft and be spaced-apart thereof with the inner gas flow channel extending inbetween. The inner gas flow channel and the outer gas flow channel can be in fluid communication above an upper free end of the partition wall.

The partition wall can comprise a tubular shell extending upwardly from the bottom wall of the organic matter-receiving container to prevent organic matter contained in the organic matter-receiving chamber from entering into the gas-plenum chamber.

In an embodiment, the inner gas flow channel and the outer gas flow channel are in gas communication in an upper section of the at least one grinding assembly.

In an embodiment, the drive shaft of the at least one grinding assembly extends through an aperture defined in the bottom wall of the organic matter-receiving container. The organic waste processing device can further comprise an actuator assembly at least partially located between the base of the casing and the bottom wall of the organic matter-receiving container and wherein the drive shaft can comprise a lower section operatively coupled to the actuator assembly to be engaged in rotation.

In an embodiment, the casing further comprises a gas entrance port and wherein the peripheral wall of the casing is at least partially spaced-apart from the peripheral wall of the organic matter-receiving container defining inbetween a peripheral wall spacing in gas communication with the gas entrance port and in which gas drawn into the internal compartment flows upstream of the gas-propelling unit.

In an embodiment, the blade support sleeve covers a section of the drive shaft extending in the organic matter-receiving chamber.

In an embodiment, the at least one gas flow channel is in gas communication with the organic matter-receiving chamber at least through a spacing defined between a lower end of the peripheral wall of the blade support sleeve and the bottom wall of the organic matter-receiving container.

In an embodiment, the at least one grinding assembly comprises more than one grinding assembly, spaced-apart from one another in the organic matter-receiving container and extending upwardly from the bottom wall of the organic matter-receiving container.

In an embodiment, the blade support sleeve comprises a lower end spaced-apart from an inner face of the bottom wall of the organic matter-receiving container to allow gas flowing into the at least one gas flow channel to enter into the organic matter-receiving chamber.

In an embodiment, the blade support sleeve is removably mounted to the drive shaft. The blade support sleeve and the drive shaft can be detachably engageable at upper ends thereof.

In an embodiment, the at least one blade comprises a plurality of rows of blades apart from one another along a longitudinal axis of the at least one grinding assembly, each one of the rows of blades including a plurality of radially spaced-apart blades. The blades of a first one of the rows of a respective one of the at least one grinding assembly can be angularly offset from the blades of a second one of the rows of the respective one of the at least one grinding assembly.

In an embodiment, the gas flows upwardly inside the organic matter-receiving chamber, entering adjacent to the bottom wall of the organic matter-receiving container and exiting at an upper end of the peripheral wall of the organic matter-receiving chamber.

According to another general aspect, there is provided an organic waste processing device comprising: an organic matter-receiving container having a bottom wall and a peripheral wall extending from the bottom wall and defining together an organic matter-receiving chamber; and at least one grinding assembly at least partially contained in the organic matter-receiving chamber. Each one of the at least one grinding assembly comprises: a drive shaft having an inner channel extending longitudinally therethrough and an outer peripheral surface; and a rotatable blade assembly including a blade support sleeve mounted to said drive shaft and being engaged in rotation therewith, said blade support sleeve having a sleeve outer peripheral surface and the rotatable blade assembly further includes at least one blade mounted to the blade support sleeve and extending outwardly from said sleeve outer peripheral surface into the organic matter-receiving chamber. The drive shaft and the blade support sleeve are in fluid communication and configured to define at least one gas path to provide gas flow flowing from said inner channel of the drive shaft into said organic matter-receiving chamber. The organic waste processing device also comprises a gas-propelling unit in gas communication with the inner channel of said drive shaft.

In an embodiment, the organic waste processing device further comprises a heating unit configured to heat organic waste contained in the organic matter-receiving chamber.

In an embodiment, the organic waste processing device further comprises a casing including a base and a peripheral wall, extending upwardly from the base, and defining together an internal compartment, the organic matter-receiving container being removably insertable in the internal compartment of the casing with the bottom wall of the organic matter-receiving container being spaced-apart from the base of the casing to define a gas-plenum chamber inbetween and in gas communication with and being located between the gas-propelling unit and the inner channel of the drive shaft of the at least one grinding assembly in the at least one gas path.

The organic waste processing device can further comprise a gas-heating unit at least partially contained in the gas-plenum chamber and configured to heat gas propelled by the gas-propelling unit while it flows into the gas-plenum chamber and before it contacts the blade support sleeve.

The organic waste processing device can further comprise a gas-filtering assembly mounted downstream of the organic matter-receiving container in the at least one gas path.

The organic waste processing device can further comprise a lid engageable with the casing and containing the gas-filtering assembly.

In an embodiment, the drive shaft of the at least one grinding assembly can extend through an aperture defined in the bottom wall of the organic matter-receiving container and the inner channel of the drive shaft can comprise a gas port opened in the gas-plenum chamber.

The organic waste processing device can further comprise an actuator assembly at least partially located between the base of the casing and the bottom wall of the organic matter-receiving container and the drive shaft can comprise a lower section operatively coupled to the actuator assembly to be engaged in rotation.

In an embodiment, the blade support sleeve covers a section of the drive shaft extending in the organic matter-receiving chamber with an inner surface of a peripheral wall of the blade support sleeve being at least partially spaced-apart from outer peripheral surface of the drive shaft to define a gas flow channel inbetween, the gas flow channel being in gas communication with the inner channel of the drive shaft. The peripheral wall of the drive shaft can comprise at least one aperture defined therethrough to provide gas communication between the inner channel of the drive shaft and the gas flow channel.

In an embodiment, the gas flow channel is in gas communication with the organic matter-receiving chamber at least through a spacing defined between a lower end of the peripheral wall of the blade support sleeve and the bottom wall of the organic matter-receiving container.

In an embodiment, the at least one grinding assembly comprises more than one grinding assembly, spaced-apart from one another in the organic matter-receiving container and extending upwardly from the bottom wall of the organic matter-receiving container.

In an embodiment, the blade support sleeve comprises a peripheral wall with an inner surface spaced-apart from the outer peripheral surface of the drive shaft to define a gas flow channel inbetween, the gas flow channel being downstream of the inner channel of the drive shaft in the at least one gas path. The blade support sleeve can comprise a lower end spaced-apart from an inner face of the bottom wall of the organic matter-receiving container to allow gas flowing into the gas flow channel to enter into the organic matter-receiving chamber.

The drive shaft can comprise at least one aperture extending therethrough and providing gas communication between the inner channel of the drive shaft and the gas flow channel. The at least one aperture can be provided at an upper section of the drive shaft.

In an embodiment, the blade support sleeve is removably mounted to the drive shaft. The blade support sleeve and the drive shaft can be detachably engageable at upper ends thereof.

In an embodiment, the at least one blade comprises a plurality of rows of blades apart from one another along a longitudinal axis of the at least one grinding assembly, each one of the rows of blades including a plurality of radially spaced-apart blades. The blades of a first one of the rows of a respective one of the at least one grinding assembly can be angularly offset from the blades of a second one of the rows of the respective one of the at least one grinding assembly.

In an embodiment, the gas flows upwardly along the at least one gas path inside the organic matter-receiving chamber, entering adjacent to the bottom wall of the organic matter-receiving container and exiting at the peripheral wall of the organic matter-receiving chamber.

In accordance with a further general aspect, there is provided an organic waste processing device comprising: an organic matter-receiving container having a bottom wall and a peripheral wall extending from the bottom wall and defining together an organic matter-receiving chamber; and at least one grinding assembly at least partially contained in said organic matter-receiving chamber and having a longitudinal axis. Each one of said at least one grinding assembly comprises: a drive shaft; and a rotatable blade assembly including a blade support sleeve mounted to said drive shaft and being engaged in rotation therewith, said blade support sleeve having a sleeve outer peripheral surface and at least two rows of at least one blade mounted to the blade support sleeve and extending outwardly from the sleeve outer peripheral surface into the organic matter-receiving chamber and being longitudinally spaced-apart from one another.

In an embodiment, the at least one blade comprises a plurality of blades radially spaced-apart blades. The blades of a first one of the at least two rows of a respective one of the at least one grinding assembly can be angularly offset from the blades of a second one of the at least two rows of the respective one of the at least one grinding assembly.

In an embodiment, the organic waste processing device further comprises: a casing including a base and a peripheral wall, extending upwardly from the base, and defining together an internal compartment, the casing having a gas-plenum chamber defined therein and the organic matter-receiving container is insertable in the internal compartment of the casing; a gas-propelling unit in gas communication with the gas-plenum chamber; and wherein the drive shaft has an outer peripheral surface, and the blade support sleeve has a peripheral wall with an inner surface, the inner surface being spaced-apart from the outer peripheral surface of the drive shaft, when the blade support sleeve is mounted to the drive shaft, to define at least one gas flow channel extending longitudinally into the at least one griding assembly and providing gas communication between the gas-plenum chamber and the organic matter-receiving chamber.

In an embodiment, the organic waste processing device further comprises: a heating unit configured to heat organic waste contained in the organic matter-receiving chamber. The organic matter-receiving container can be removably insertable in the internal compartment of the casing with the bottom wall of the organic matter-receiving container being spaced-apart from the base of the casing to define the gas-plenum chamber inbetween and in gas communication with the gas-propelling unit and the at least one gas flow channel of the at least one grinding assembly, the gas-propelling unit generating a gas flow from the gas-plenum chamber towards the organic matter-receiving container and through the at least one gas flow channel of the at least one grinding assembly.

In an embodiment, the organic waste processing device further comprises a gas-heating unit at least partially contained in the gas-plenum chamber and configured to heat gas propelled by the gas-propelling unit while flowing into the gas-plenum chamber. The gas-heating unit can comprise at least one heating element contained at least partially in the gas-plenum chamber. The gas-heating unit can comprise a partition wall located in the gas-plenum chamber and surrounding at least partially the at least one heating element; and a plurality of fins dividing the gas flow to enhance heat transfer with the at least one heating element.

In an embodiment, the gas-propelling unit circulates the gas flow along a gas flow path defined in the organic waste processing device, the gas flow path including sequentially the gas-plenum chamber, the at least one gas flow channel extending longitudinally into the at least one griding assembly, and the organic matter-receiving chamber, wherein the organic waste processing device further comprises a gas-filtering assembly mounted downstream of the organic matter-receiving container in the gas flow path.

In an embodiment, the organic waste processing device further comprises: a lid engageable with the casing and containing the gas-filtering assembly.

In an embodiment, the at least one gas flow channel comprises an ascending gas flow channel and a descending gas flow channel. The descending gas flow channel can surround the ascending gas flow channel with a partition wall extending inbetween. The partition wall can comprise a peripheral wall of the drive shaft defining a gas port opened in the gas-plenum chamber.

The peripheral wall of the drive shaft can comprise at least one aperture extending therethrough to provide gas communication between the ascending gas flow channel and the descending gas flow channel. The at least one aperture can be located in an upper section of the peripheral wall of the drive shaft.

The drive shaft can be located centrally inside the ascending gas flow channel and the partition wall can surround the drive shaft and is spaced-apart thereof with the ascending gas flow channel extending inbetween. The ascending gas flow channel and the descending gas flow channel can be in fluid communication above an upper free end of the partition wall.

The partition wall can comprise a tubular shell extending upwardly from the bottom wall of the organic matter-receiving container to prevent organic matter contained in the organic matter-receiving chamber from entering into the gas-plenum chamber.

In an embodiment, the ascending gas flow channel and the descending gas flow channel are in gas communication in an upper section of the at least one grinding assembly.

In an embodiment, the at least one gas flow channel comprises an inner gas flow channel and an outer gas flow channel. The outer gas flow channel can surround the inner gas flow channel with a partition wall extending inbetween.

The partition wall can comprise a peripheral wall of the drive shaft defining a gas port opened in the gas-plenum chamber. The peripheral wall of the drive shaft can comprise at least one aperture extending therethrough to provide gas communication between the inner gas flow channel and the outer gas flow channel. The at least one aperture can be located in an upper section of the peripheral wall of the drive shaft.

The drive shaft can be located centrally inside the inner gas flow channel and the partition wall can surround the drive shaft and is spaced-apart thereof with the inner gas flow channel extending inbetween. The inner gas flow channel and the outer gas flow channel can be in fluid communication above an upper free end of the partition wall.

In an embodiment, the partition wall comprises a tubular shell extending upwardly from the bottom wall of the organic matter-receiving container and preventing organic matter contained in the organic matter-receiving chamber to enter into the gas-plenum chamber.

In an embodiment, the inner gas flow channel and the outer gas flow channel are in gas communication in an upper section of the at least one grinding assembly.

In an embodiment, the drive shaft of the at least one grinding assembly extends through an aperture defined in the bottom wall of the organic matter-receiving container.

In an embodiment, the organic waste processing device further comprises: an actuator assembly at least partially located between the base of the casing and the bottom wall of the organic matter-receiving container and wherein the drive shaft comprises a lower section operatively coupled to the actuator assembly to be engaged in rotation.

In an embodiment, the casing further comprises a gas entrance port and wherein the peripheral wall of the casing is at least partially spaced-apart from the peripheral wall of the organic matter-receiving container defining inbetween a peripheral wall spacing in gas communication with the gas entrance port and in which gas drawn into the internal compartment flows upstream of the gas-propelling unit.

In an embodiment, the at least one gas flow channel is in gas communication with the organic matter-receiving chamber at least through a spacing defined between a lower end of the peripheral wall of the blade support sleeve and the bottom wall of the organic matter-receiving container.

In an embodiment, the at least one grinding assembly comprises more than one grinding assembly, spaced-apart from one another in the organic matter-receiving container and extending upwardly from the bottom wall of the organic matter-receiving container.

In an embodiment, the blade support sleeve comprises a lower end spaced-apart from an inner face of the bottom wall of the organic matter-receiving container to allow gas flowing into the at least one gas flow channel to enter into the organic matter-receiving chamber.

In an embodiment, the blade support sleeve is removably mounted to the drive shaft. The blade support sleeve and the drive shaft can be detachably engageable at upper ends thereof. The gas can flow upwardly along the gas flow path inside the organic matter-receiving chamber, entering adjacent to the bottom wall of the organic matter-receiving container and exiting at the peripheral wall of the organic matter-receiving chamber.

According with still another general aspect, there is provided a method for grinding and drying waste organic matter. The method comprises the steps: adding waste organic matter into an organic matter-receiving chamber; and simultaneously grinding the waste organic matter by engaging in rotation at least one grinding assembly having at least one blade mounted thereon and drying the waste organic matter while it is grinded by blowing gas into the organic matter-receiving chamber through the at least one grinding assembly.

In an embodiment, the method further comprises heating the gas before blowing same into the organic matter-receiving chamber to a gas temperature comprised between about 35° C. and about 110° C.

In an embodiment, the simultaneously grinding and drying is carried out during a portion of a process cycle and only one of the griding and the drying is carried for another portion of the process cycle. Drying the waste organic matter can further comprise heating the gas to a gas temperature comprised between about 35° C. and about 110° C. before blowing same into the organic matter-receiving chamber during at least a portion of the process cycle.

In an embodiment, blowing the gas into the organic matter-receiving chamber comprises feeding the gas adjacent to a bottom wall of the organic matter-receiving chamber.

In an embodiment, blowing gas into the organic matter-receiving chamber through the at least one grinding assembly comprises blowing the gas into at least one gas flow channel extending between a drive shaft and a blade support sleeve of the at least one grinding assembly. Grinding the waste organic matter can comprise engaging in rotation the blade support sleeve via a rotation of the drive shaft.

In an embodiment, drying the waste organic matter is carried out continuously during about 150 minutes to about 1440 minutes.

In an embodiment, grinding the waste organic matter is carried out intermittently while drying the waste organic matter.

In an embodiment, the at least one grinding assembly rotates at a rotational speed between about 10 rpm and about 150 rpm.

In an embodiment, blowing gas into the organic matter-receiving chamber comprises blowing a gas at a gas flowrate ranging between about 1 CFM and about 10 CFM.

In an embodiment, blowing gas is carried out continuously while drying the organic matter contained in the organic matter-receiving chamber.

In an embodiment, adding the waste organic matter into the organic matter-receiving chamber comprises filing about 5% to about 90% of a total volume of the organic matter-receiving chamber with the organic matter.

In an embodiment, the method further comprises closing the organic matter-receiving chamber with a lid and wherein blowing gas comprises introducing gas into the organic matter-receiving chamber adjacent to a bottom wall thereof and withdrawing gas from the organic matter-receiving chamber in an upper portion thereof and through the lid.

According with a further general aspect, there is provided an organic waste processing device comprising: an organic matter-receiving container having a bottom wall and a peripheral wall extending from the bottom wall and defining together an organic matter-receiving chamber; and at least two grinding assemblies at least partially contained in said organic matter-receiving chamber, each one of said at least one grinding assembly comprising: a rotatable blade assembly having an outer peripheral surface and at least one blade extending outwardly from the outer peripheral surface into the organic matter-receiving chamber and being engageable in rotation to cover a blade cutting path, the blade cutting paths of two of the at least two grinding assemblies overlapping each other.

In an embodiment, the at least one blade comprises a plurality of blades radially spaced-apart blades. Each one of the rotatable blade assembly comprises at least two rows of blades longitudinally spaced-apart from one another; and wherein the blades of a first one of the at least two rows of a respective one of the at least one grinding assembly are angularly offset from the blades of a second one of the at least two rows of the respective one of the at least one grinding assembly.

In an embodiment, the organic matter-receiving container has a substantially elliptical cross-section with a length and a width, and the length of the organic matter-receiving container is shorter than twice the width of the organic matter-receiving container.

In an embodiment, a diameter of each one of the blade cutting path is substantially equal to (or substantially corresponds to) a width of the organic matter-receiving container.

In an embodiment, a diameter of the at least one grinding assembly is substantially equal to (or substantially corresponds to) the width of the organic matter-receiving container.

In an embodiment, the organic waste processing device further comprises: a casing including a base and a peripheral wall, extending upwardly from the base, and defining together an internal compartment, the casing having a gas-plenum chamber defined therein and the organic matter-receiving container is insertable in the internal compartment of the casing; a gas-propelling unit in gas communication with the gas-plenum chamber; and wherein each one of the at least two grinding assemblies has a longitudinal axis and comprises a drive shaft having an outer peripheral surface, and the rotatable blade assembly comprises a blade support sleeve mounted to the drive shaft and being engaged in rotation therewith, the blade support sleeve has a peripheral wall with an inner surface and the outer peripheral surface, the inner surface being spaced-apart from the outer peripheral surface of the drive shaft, when the blade support sleeve is mounted to the drive shaft, to define at least one gas flow channel extending longitudinally into the at least one griding assembly and providing gas communication between the gas-plenum chamber and the organic matter-receiving chamber.

In an embodiment, the organic matter-receiving container is removably insertable in the internal compartment of the casing with the bottom wall of the organic matter-receiving container being spaced-apart from the base of the casing to define the gas-plenum chamber inbetween and in gas communication with the gas-propelling unit and the at least one gas flow channel of the at least one grinding assembly, the gas-propelling unit generating a gas flow from the gas-plenum chamber towards the organic matter-receiving container and through the at least one gas flow channel of the at least one grinding assembly. The organic waste processing device can further comprise a gas-heating unit at least partially contained in the gas-plenum chamber and configured to heat gas propelled by the gas-propelling unit while flowing into the gas-plenum chamber. The gas-heating unit can comprise at least one heating element contained at least partially in the gas-plenum chamber.

In an embodiment, the gas-propelling unit circulates the gas flow along a gas flow path defined in the organic waste processing device, the gas flow path including sequentially the gas-plenum chamber, the at least one gas flow channel extending longitudinally into the at least one griding assembly, and the organic matter-receiving chamber, wherein the organic waste processing device further comprises a gas-filtering assembly mounted downstream of the organic matter-receiving container in the gas flow path. The organic waste processing device can further comprise a lid engageable with the casing and containing the gas-filtering assembly.

In an embodiment, the organic waste processing device further comprises a lid engageable with at least one of the casing and the organic matter-receiving container, the lid comprising a gas inlet port in gas communication with the organic matter-receiving chamber and a gas outlet port to expel gas outwardly of the organic waste processing device.

In an embodiment, the lid is sealed to the at least one of the casing and the organic matter-receiving container in a closed configuration thereof.

According with still another general aspect, there is provided an organic waste processing device comprising: a casing including a base and a peripheral wall, extending upwardly from the base, and defining together an internal compartment; an organic matter-receiving container insertable in the internal compartment of the casing and having a bottom wall and a peripheral wall extending from the bottom wall and defining together an organic matter-receiving chamber; a gas-propelling unit in gas communication with the organic matter-receiving chamber; at least one grinding assembly at least partially contained in the organic matter-receiving chamber; and a lid engageable with at least one of the casing and the organic matter-receiving container, the lid comprising a gas inlet port in gas communication with the organic matter-receiving chamber and a gas outlet port to expel gas outwardly of the organic waste processing device.

In an embodiment, the organic waste processing device further comprises a heating unit configured to heat organic waste contained in the organic matter-receiving chamber. The organic matter-receiving container can be removably insertable in the internal compartment of the casing with the bottom wall of the organic matter-receiving container being spaced-apart from the base of the casing to define a gas-plenum chamber inbetween and in gas communication with the gas-propelling unit, the gas-propelling unit generating a gas flow from the gas-plenum chamber towards the organic matter-receiving container and through at least one gas flow channel extending through the at least one grinding assembly.

In an embodiment, the organic waste processing device further comprises a gas-heating unit at least partially contained in the gas-plenum chamber and configured to heat gas propelled by the gas-propelling unit while flowing into the gas-plenum chamber.

In an embodiment, the gas-propelling unit circulates the gas flow along a gas flow path defined in the organic waste processing device, the gas flow path including sequentially the gas-plenum chamber, the at least one gas flow channel extending longitudinally into the at least one griding assembly, and the organic matter-receiving chamber, wherein the organic waste processing device further comprises a gas-filtering assembly at least partially contained in the lid and mounted downstream of the organic matter-receiving container in the gas flow path and in gas communication with the gas inlet port and the gas outlet port.

In an embodiment, the lid is sealed to the at least one of the casing and the organic matter-receiving container in a closed configuration thereof.

Detailed Description

DESCRIPTION OF PARTICULAR EMBODIMENTS

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the device and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the device, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Moreover, although the associated method includes steps as explained and illustrated herein, not all of these steps are essential and thus should not be taken in their restrictive sense. It will be appreciated that the steps of the method described herein may be performed in the described order, or in any suitable order, unless otherwise specifically stated.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

Figure 1:
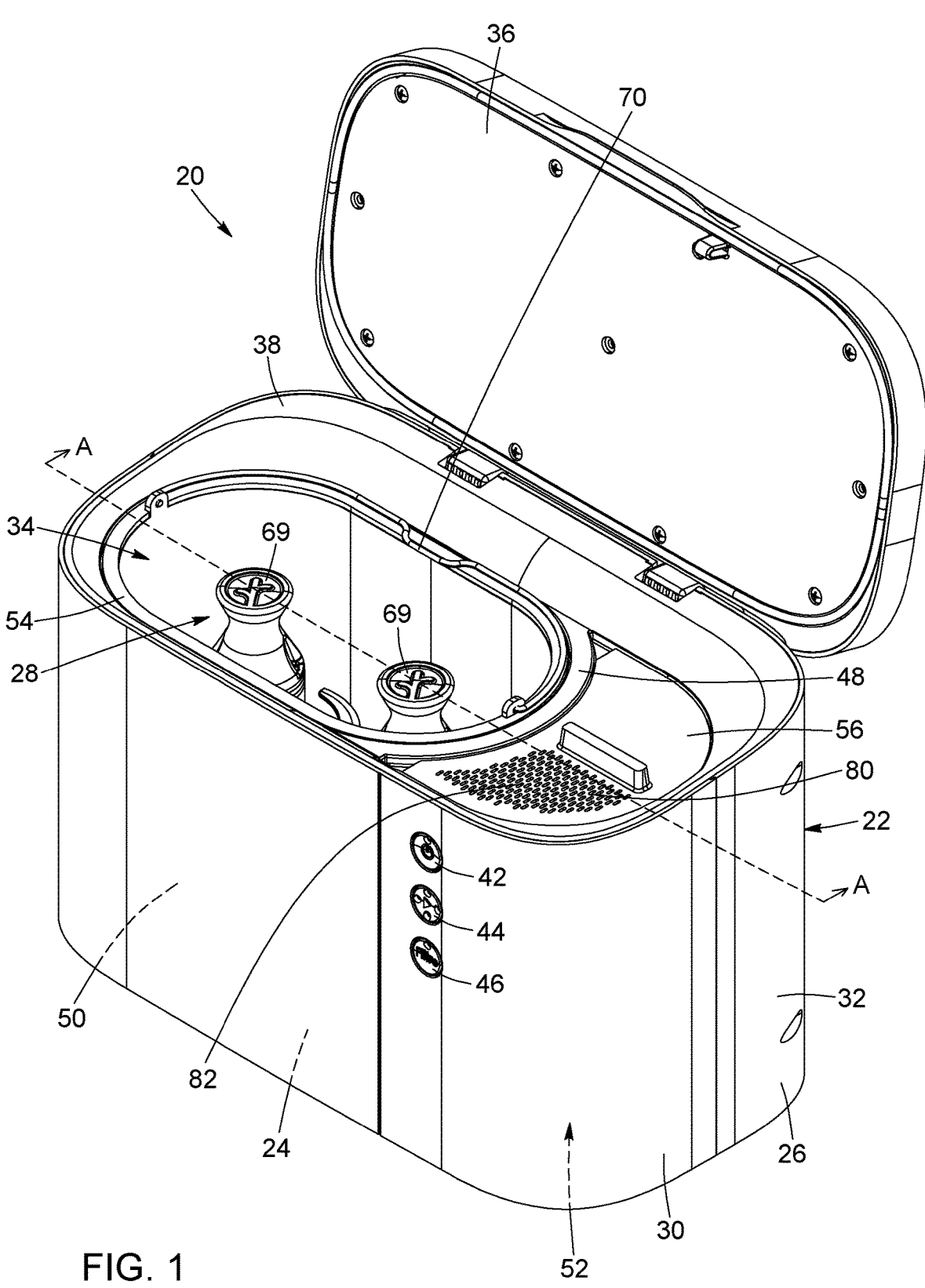
FIG. 1 is a top and front perspective view of an organic waste processing device, in accordance with an embodiment, wherein a lid is configured in an open configuration to show internal components thereof.

Referring to the drawings and more particularly to FIG. 1, there is shown a non-limitative embodiment of an organic waste processing device 20 (or organic matter grinding-drying device 20). The organic matter grinding-drying device 20 is configured to process, i.e. at least to dry and grind (or shred), organic waste such as, and without being limitative, domestic organic waste such as food residue, and to transform same into a fertilizer (or a plant growth supplement) for plants and garden. In an embodiment, the organic waste processing device 20 is a domestic appliance configured to transform organic matter, such as table waste, into a natural fertilizer ready for plants and garden, The organic matter grinding-drying device 20 includes a casing 22 having a base 24 and a peripheral wall 26, extending upwardly from the base 24, and defining together an internal compartment 28. In the embodiment shown, the peripheral wall 26 of the casing 22 comprises two wall portions 30 and 32 secured together and to the base 24 to define the internal compartment 28. The internal compartment 28 has an access port 34 in an upper portion of the casing 22. The organic matter grinding-drying device 20 also includes a lid 36, pivotally mounted to the casing 22, in the upper portion thereof, through hinges connecting at a peripheral edge of the lid 36 to a peripheral upper edge of the casing 22. In the upper portion of the casing 22, the access port 34 is delimited by an upper rim 38, extending inwardly from the upper edges of the wall portions 30, 32. In the embodiment shown, one of the wall portions 30, 32 has apertures defined therein and intended to accommodate operating buttons, such as, and without being limitative a power button 42, a stand-by button 44, and a reset filter button 46.

The lid 36 is selectively configurable in a closed configuration, wherein it extends above and covers the access port 34 and closes the internal compartment 28, and an open configuration, wherein the access port 34 is uncovered and the internal compartment 28 is accessible. As mentioned above, in the embodiment shown, the lid 36 is pivotally mounted to the casing 22. However, in an alternative embodiment (not shown), the lid can be removably engageable with the casing to close the access port 34 when engaged therewith.

In the non-limitative embodiment shown, the casing 22 further comprises a partition wall 48 separating the internal compartment 28 into two sub-compartments 50, 52. A first one 50 of the sub-compartments is configured to removably receive an organic matter-receiving container 54 while a second one 52 of the sub-compartments is configured to removably receive a gas-filtering assembly 56, which may contain a deodorizing agent (not shown). It is appreciated that the number, the shape and the configuration of the casing 22 including the partition wall(s) and the sub-compartments can vary from the embodiment shown.

Figure 4:
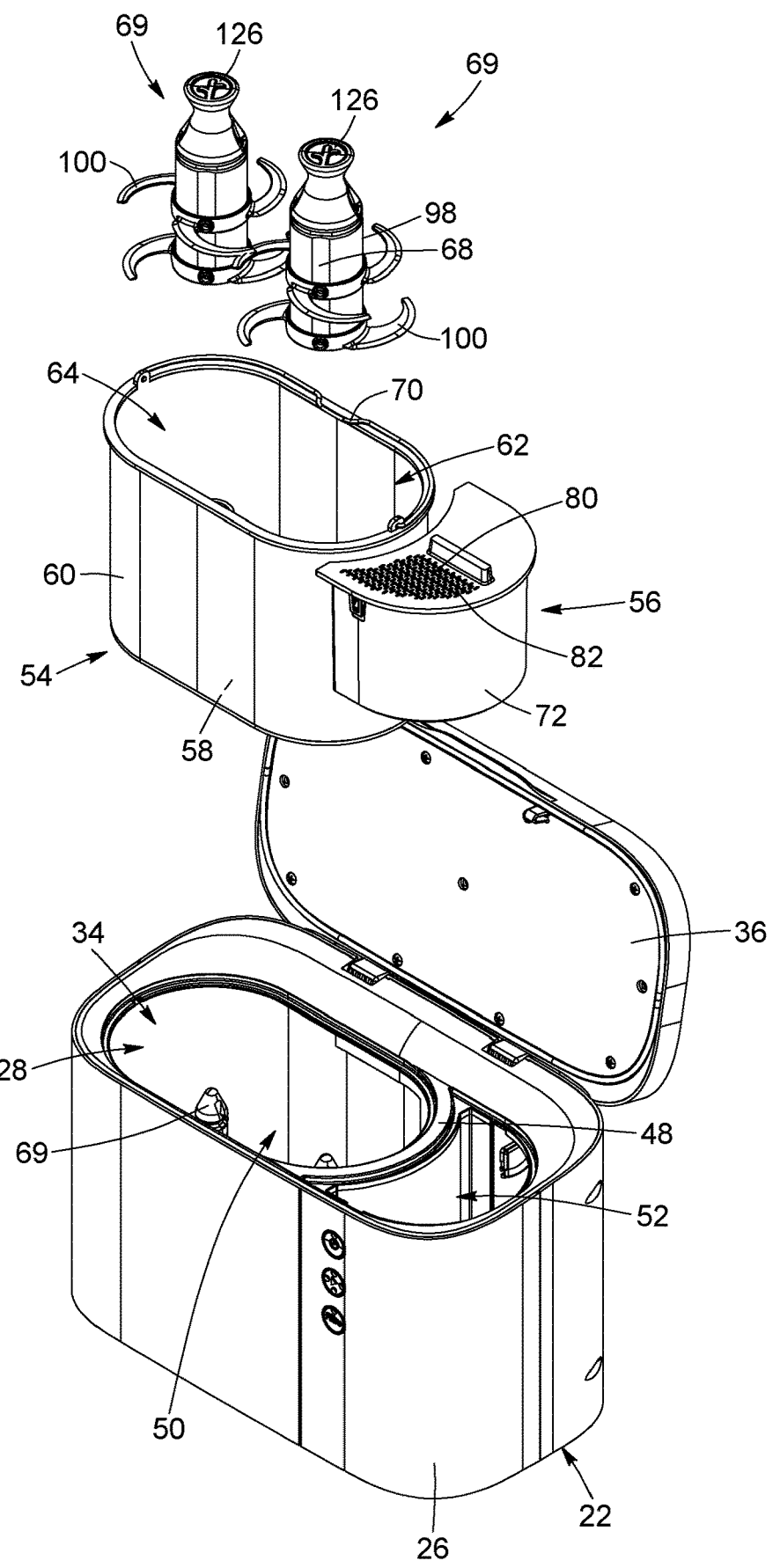
FIG. 4 is a front perspective view of the organic waste processing device shown in FIG. 1 showing at least some removable components withdrawn from a casing.
Figure 5:
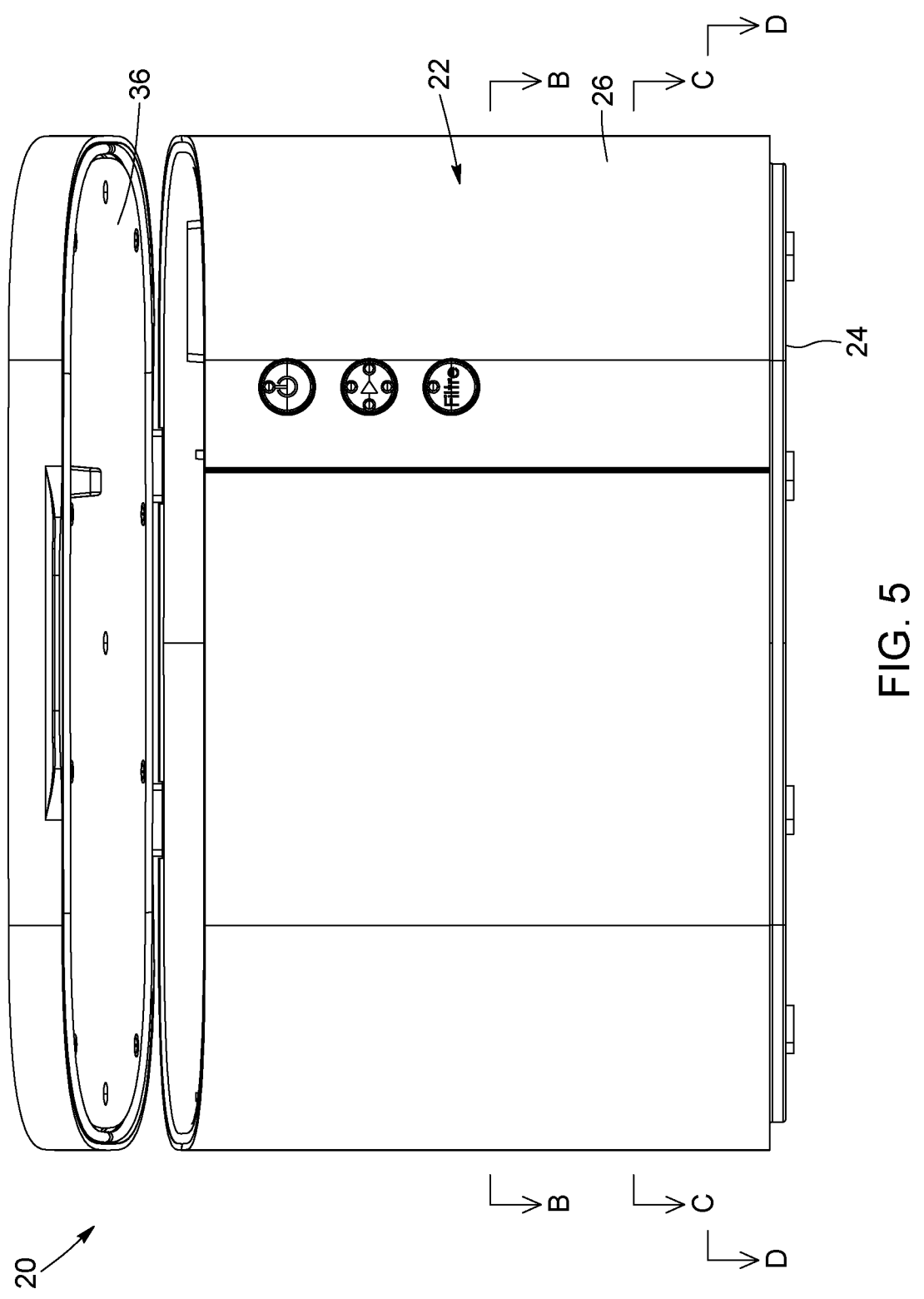
FIG. 5 is a front elevation view of the organic waste processing device of FIG. 1.

Turning now to FIG. 4 showing some of the removable components, including the organic matter-receiving container 54 and the gas-filtering assembly 56, withdrawn from the casing 22, there is shown that the organic matter-receiving container 54 includes a bottom wall 58 and a peripheral wall 60, extending upwardly from the bottom wall 58 and defining together an organic matter-receiving chamber 62 accessible from an organic matter-receiving opening 64, delimited by an upper end of the peripheral wall 60, and configured to receive organic matter (or organic waste) that is spoiled, wet, uneatable or any other matter that is considered domestic waste.

The organic matter-receiving container 54 is removably insertable in the internal compartment 28 of the casing 22, through the access port 34, with the bottom wall 58 of the organic matter-receiving container 54 being spaced-apart from the base 24 of the casing 22, when inserted therein. In the embodiment shown, a gas-plenum chamber 40 (FIGS. 2 and 3) is defined between the bottom wall 58 of the organic matter-receiving container 54 and the base 24 of the casing 22, when the organic matter-receiving container 54 is inserted in the casing 22. It is appreciated that the gas-plenum chamber can be located at a different location in the organic matter grinding-drying device 20.

When the organic matter-receiving container 54 is contained in the internal compartment 28 of the casing 22, the organic matter-receiving opening 64 is accessible, i.e. organic waste can be loaded in the organic matter-receiving chamber 62 and the product of the organic matter grinding-drying device 20 such as a fertilizer can be withdrawn from the organic matter-receiving chamber 62, in the open configuration of the lid 36. For operating the organic matter grinding-drying device 20, the lid 36 is configured in the closed configuration.

In the non-limitative embodiment shown, the organic matter-receiving container 54 includes a pivotable handle 70 (shown in a non-operative configuration wherein it is abutted against an upper edge of the peripheral wall 60) to facilitate sizing and manipulating the organic matter-receiving container 54. For instance, the handle 70 can be used for emptying the container 54 once the grinding and drying process is completed and the product, such as the fertilizer, contained in the organic matter-receiving chamber 62 is ready for use.

In the non-limitative embodiment shown, the gas-filtering assembly 56 comprises a gas-filter housing 72 defining an inner chamber (not shown) configured to contain the deodorizing agent. Gas and, more particularly, air can flow through the gas-filter housing 72 through a gas inlet port 80 defined in an upper wall of the gas-filter housing 72, exposed outwardly when the lid 36 is configured in the open configuration, and having an obstruction grid 82 extending therethrough. The gas-filtering assembly 56 also includes a gas outlet port (schematically represented by arrow 122 in FIG. 3) in gas communication with the inner chamber and the deodorizing agent contained therein. In the closed configuration of the lid 36, the gas-filtering assembly 56 is in gas communication with the organic matter-receiving chamber 62, downstream thereof along a gas flow path, in a manner such that gas exiting the organic matter-receiving chamber 62 are drawn into the gas-filtering assembly 56 before being expelled through the gas outlet port 122. Therefore, a gas stream and, more particularly, an air stream can flow into the inner chamber and contact the deodorizing agent contained therein through the gas inlet port 80 and the gas outlet port 122.

The organic matter grinding-drying device 20 further includes two grinding assemblies 69, at least partially contained in the organic matter-receiving chamber 62, each one including a drive shaft 66 and a rotatable blade assembly 67 removably mounted to the drive shaft 66 and engageable in rotation therewith. Thus, in the non-limitative embodiment shown, the organic matter grinding-drying device 20 includes two drive shafts 66, spaced-apart from one another, extending substantially parallel to one another, and protruding into the first internal sub-compartment 50, as shown in FIG. 4. It is appreciated that, in an alternative embodiment, the organic matter grinding-drying device 20 can include one, two or more than two rotatable grinding assemblies 69.

Each one of the rotatable blade assemblies 67 includes a blade support sleeve 68 removably mounted to a respective one of the drive shafts 66 and being engaged simultaneously in rotation therewith. Each one of the blade support sleeves 68 has a sleeve outer peripheral surface 98. Each one of the rotatable blade assemblies 67 further includes at least one blade 100 mounted to the respective one of the blade support sleeves 68 and extending outwardly from the sleeve outer peripheral surface 98. In the non-limitative embodiment shown, the blades 100 extends radially from the sleeve outer peripheral surface 98. In the non-limitative embodiment shown, each rotatable blade assembly 67 includes two rows of three blades 100, the rows being spaced-apart longitudinally from one another, and the blades of each row being radially spaced-apart from one another, along the blade support sleeves 68 and into the organic matter-receiving chamber 62. Furthermore, in the non-limitative embodiment shown, the blades of the two rows are axially offset, i.e. the blades of vertically spaced-apart rows are not aligned with one another. The blades 100 are configured to contact the organic waste contained in the organic matter-receiving chamber 62 to grind/shred same upon rotation of the grinding assemblies 69. It is appreciated that the number of blade rows of each rotatable blade assembly 67, the number of blades in each row, and the blade configuration and shape of the blades can vary from the embodiment shown.

When engaged in rotation about the longitudinal axis of their respective drive shaft 66, the blades 100 cover a blade cutting path. In an embodiment, a diameter of the blade cutting path substantially corresponds to a width W of the organic matter-receiving container 54, i.e. a diameter of each grinding assembly, including the outwardly extending blades 100, substantially corresponds to a width W of the organic matter-receiving container 54. In the embodiment shown, in a central portion of the organic matter-receiving container 54, the blade cutting baths of the two rotatable blade assemblies 67 overlap each other, thereby reducing the uncovered portions of the organic matter-receiving chamber 62 wherein organic matter contained in the organic matter-receiving chamber 62 can be uncontacted by the blades 100 and remain stationary therein, i.e. unground.

Figure 6:
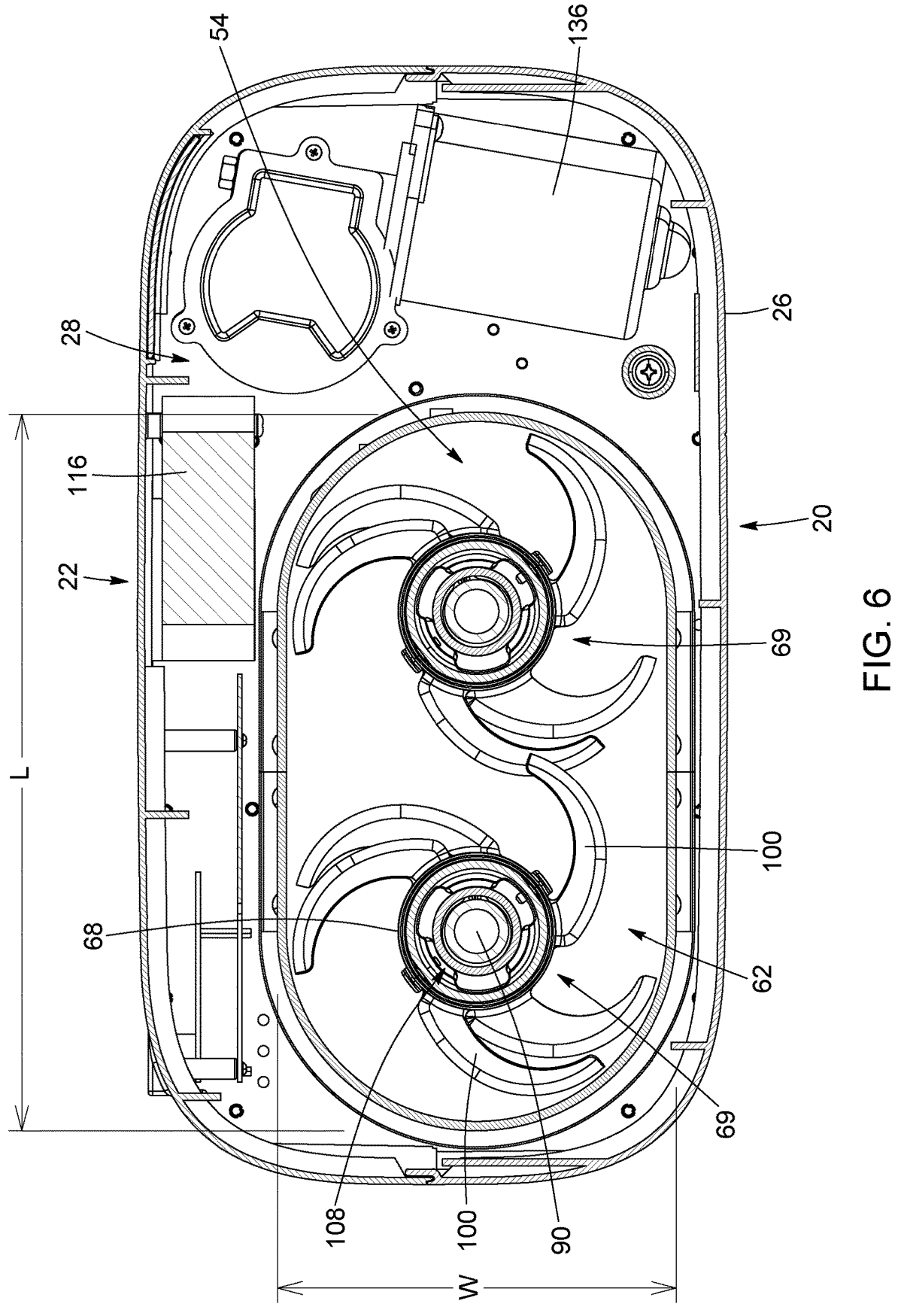
FIG. 6 is a sectional view taken along cross-section lines B-B of the organic waste processing device of FIG. 5.

In the embodiment shown in FIG. 6, the organic matter-receiving container 54 has a substantially elliptical cross-section with a length L and the width W. In the embodiment shown, the length L of the organic matter-receiving container 54 is shorter than twice its width W. Therefore, in some embodiments, the blade cutting paths of the grinding assemblies overlap each other.

Each one of the drive shafts 66 has a lower end 84 extends through an aperture 76 defined in the bottom wall 58 of the organic matter-receiving container 54. The lower end 84 is located in the gas-plenum chamber 40, adjacent to the base 24. Since they are rotatable, the drive shafts 66 can be connected to the casing 22 and/or the organic matter-receiving container 54 through bearing assemblies, as it is known in the art. The drive shafts 66 extend upwardly from the gas-plenum chamber 40 and into the organic matter-receiving chamber 62, with a majority of their length extending in the organic matter-receiving chamber 62. The drive shafts 66 are operatively coupled to an actuator assembly 86 (FIG. 8) to engage same in rotation, as will be described in more details below. As mentioned above, the organic matter-receiving container 54 is provided with apertures 76 extending through the bottom wall 58 thereof and aligned with the drive shafts 66 when the organic matter-receiving container 54 is inserted in the first internal sub-compartment 50. Therefore, when the organic matter-receiving container 54 is inserted in the first internal sub-compartment 50, the drive shafts 66 have a section extending upwardly into the organic matter-receiving chamber 62.

In the non-limitative embodiment shown, referring to FIGS. 2 and 3, the drive shafts 66 are substantially cylindrical in shape with a peripheral wall 88 defining an inner (or interior) gas flow channel 90, extending longitudinally therethrough, to provide which is part of the gas flow path inside the organic matter grinding-drying device 20, as will be described in more details below. Since the drive shafts 66 are provided with an inner gas flow channel 90, they are also provided with at least one aperture 92 defined through their peripheral wall 88 to provide gas communication as will be described in more details below. In the non-limitative embodiment shown, each one of the drive shafts 66 includes two apertures 92, located in an upper section 94, adjacent to the upper end 96, and diametrically opposed to one another. The apertures 92 are in gas communication with the inner gas flow channel 90. It is appreciated that, in an alternative embodiment (not shown), the number of apertures 92 can vary and apertures 92 can be provided anywhere and in any suitable configuration along a length of the drive shaft 66. In an alternative embodiment (not shown), the aperture can be located at an upper and free end of the drive shaft 66.

The inner gas flow channels 90 of the drive shafts 66 have a gas port opened in the gas-plenum chamber 40. In the non-limitative embodiment shown, the gas port is defined at lower and free ends of the drive shafts 66. Therefore, air/gas can enter into the inner gas flow channels 90, from the gas-plenum chamber 40, through the gas ports.

Each one of the rotatable grinding assemblies 69 includes a rotatable blade support sleeve 68 having a sleeve outer peripheral surface 98 and two rows of blades 100 mounted to the respective one of the rotatable blade support sleeves 68 and extending radially outwardly from their sleeve outer peripheral surface 98. In the non-limitative embodiment shown, the rotatable blade support sleeves 68 are cylindrical in shape and removably engageable with a respective one of the drive shafts 66. More particularly, they can be coaxially mounted to the drive shaft 66 in a manner such that they are engaged in rotation simultaneously therewith. In a non-limitative embodiment, the rotatable blade support sleeves 68 are connected to the respective one of the drive shafts 66 through a snap-fit connection 124 provided at or in proximity of their upper ends, in the upper sections 94 of the drive shafts 66.

For cleaning purposes and removal of the organic matter-receiving container 54, the rotatable blade support sleeves 68 can be disengaged from their respective drive shaft 66, as shown in FIG. 4, and reengaged therewith, through the snap-fit connection 124. When engaged together, the rotatable blade support sleeves 68 are secured to their respective drive shaft 66, i.e. they cannot rotate relative to their drive shaft 66 but are engaged in rotation simultaneously therewith. Therefore, the blades 100 are also engaged in rotation simultaneously with the drive shaft 66 through the rotatable blade support sleeve 68 to grind/shred the organic matter contained in the organic matter-receiving container 54. In a non-limitative embodiment, by being pulled upwardly via a handle located at an upper end thereof 126, the rotatable blade support sleeve 68 can be disengaged and removed from the drive shaft 66. The handle 126 is fabricated in such a manner that the rotatable blade support sleeve 68 can be pulled off and reinserted over the drive shaft 66 as many times as needed, with ease.

In the non-limitative embodiment shown, each one of the rotatable grinding assemblies 69 includes two rows of three blades 100 each, which are spaced-apart from one another along a longitudinal axis X of the respective one of the rotatable grinding assemblies 69. It is appreciated that, in alternative embodiments, the number, the shape and the configuration of the blades 100 can vary from the embodiment shown. In the non-limitative embodiment shown, the blades 100 also extend substantially parallel to each other (FIG. 2) and substantially parallel to the bottom wall 58 of the organic matter-receiving container 54.

When the rotatable blade support sleeves 68 are engaged with the drive shaft 66, an inner surface 104 of a peripheral wall 102 of the rotatable blade support sleeve 68 is spaced-apart from the outer peripheral surface 106 of the drive shaft 66 to define an outer gas flow channel 108 inbetween. In the non-limitative embodiment shown, the outer gas flow channel 108 is substantially annular in shape, as shown in FIG. 6, and extends substantially along an entire length of the blade support sleeve 68, when the drive shaft 66 and its blade support sleeve 68 are engaged together.

In the non-limitative embodiment shown, when engaged together, the rotatable blade support sleeve 68 covers a majority of the section of the drive shaft 66 extending into the organic matter-receiving chamber 62, from an upper end 96 of the drive shaft 66 towards the bottom wall 58 of the organic matter-receiving container 54. In the embodiment shown, a lower end 110 of the blade support sleeve 68 is slightly spaced-apart from an inner face 112 of the bottom wall 58 of the organic matter-receiving container 54, to allow a gas flow and, more particularly, an airflow inbetween, as will be described in more details below. It is appreciated that, in alternative embodiments (not shown), the peripheral wall 102 of the blade support sleeve 68 can be provided with one or more aperture(s) defined therethrough and spaced-apart along a length of the blade support sleeve 68 to provide gas communication between the outer gas flow channel 108 and the organic matter-receiving chamber 62.

Figure 3:
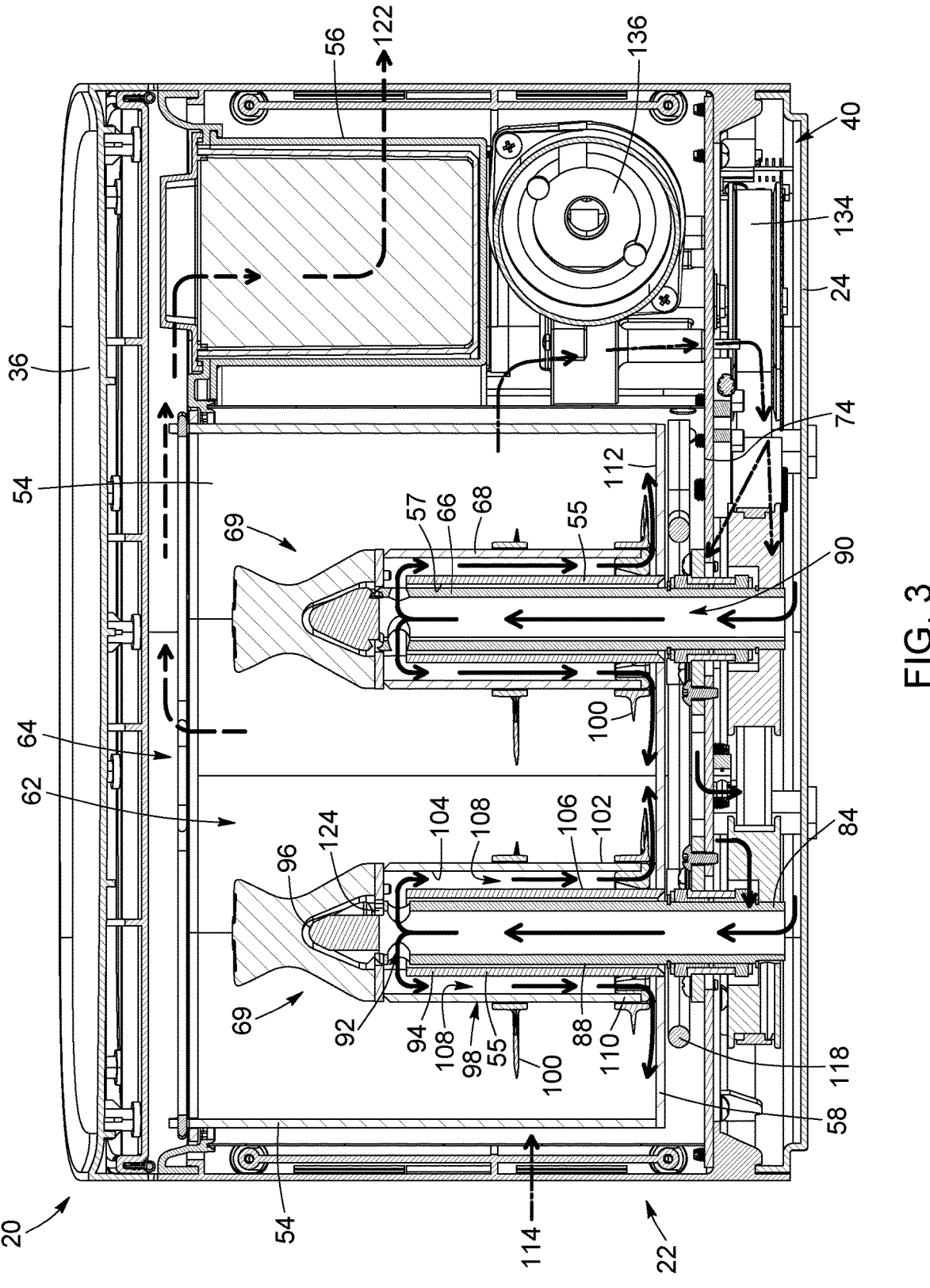
FIG. 3 is a sectional view taken along cross-section lines A-A of the organic waste processing device of FIG. 1, including arrows depicting a gas path within the organic waste processing device.

Thus, gas, such as air, can flow along the gas path, represented by arrows in FIG. 3, sequentially in the inner gas flow channels 90 of the drive shafts 66, into the apertures 92 defined in the peripheral walls 102 of the drive shafts 66, into the annular outer gas flow channels 108 defined between the drive shafts 66 and the inner surfaces 104 of the blade support sleeves 68, and exit through the spacings defined between the lower end 110 of the blade support sleeves 68 and the inner face 112 of the bottom wall 58 of the organic matter-receiving container 54 to provide a sub-stantially ascending gas flow, particularly for drying the organic matter contained in the organic matter-receiving chamber 62, as shown in FIG. 3. Thus, the inner gas flow channels 90 of the drive shafts 66 and the outer gas flow channels 108 delimitated by the arrangement of the drive shafts 66 with their respective blade support sleeves 68 are in fluid communication and define gas paths to provide a gas flow flowing from the inner gas flow channels 90 of the drive shafts 66 into the organic matter-receiving chamber 62 and, more particularly, from the gas-plenum chamber 40 towards and into the organic matter-receiving chamber 62.

Figure 2:
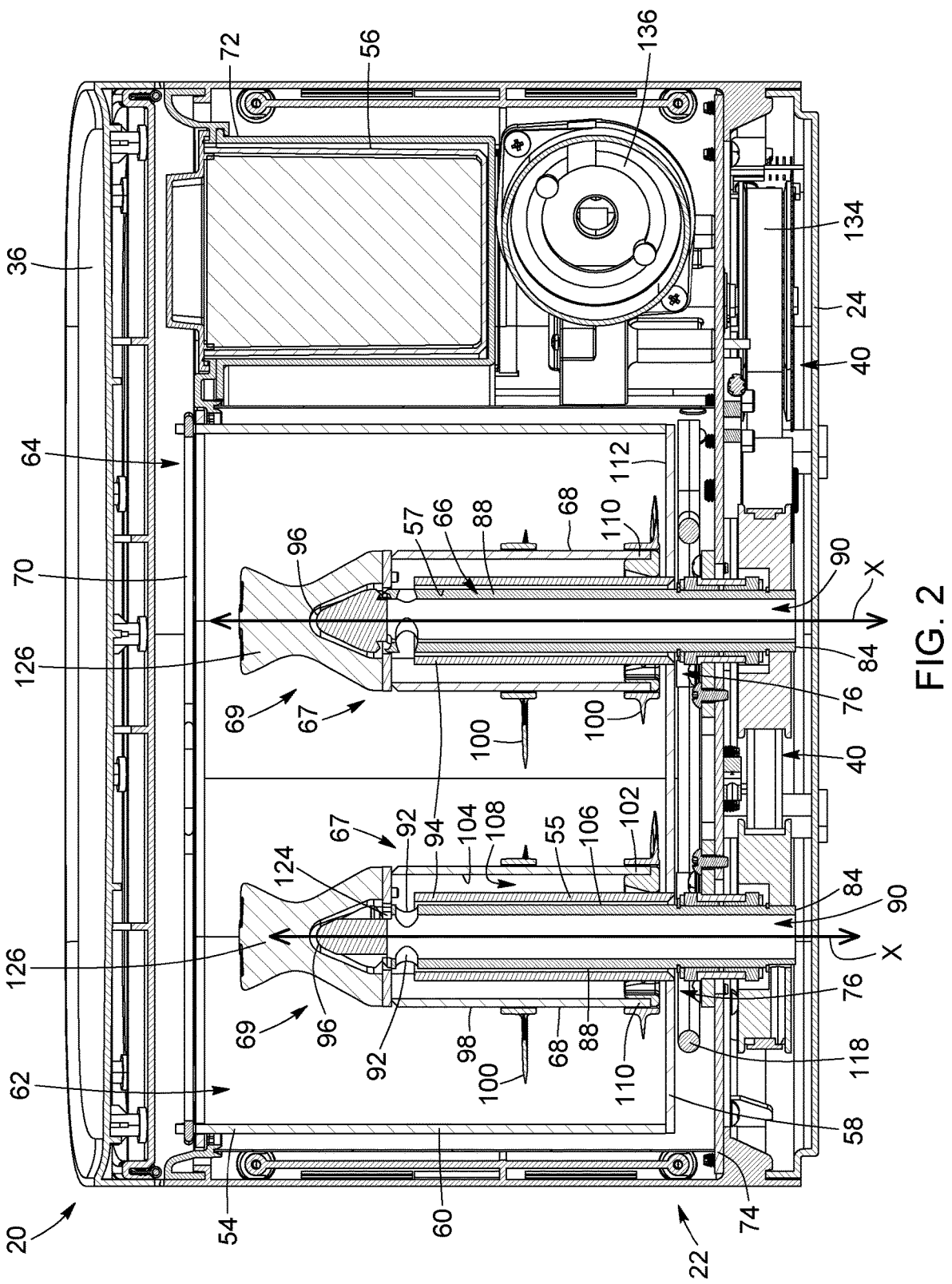
FIG. 2 is a sectional view taken along cross-section lines A-A of the organic waste processing device of FIG. 1.

Referring to FIGS. 2 and 3, there is shown that the organic matter-receiving container 54 comprises two spaced-apart tubular shells 55 extending upwardly from the bottom wall 58. Each one of the tubular shells 55 is associated to a respective one of the rotatable grinding assemblies 69. The drive shafts 66 of the grinding assemblies 69 extend through a central channel of the tubular shells 55 with their outer peripheral surface 106 being juxtaposed to an inner surface of the tubular shells 55. The drive shafts 66 are rotatable inside tubular shells 55. Furthermore, the tubular shells 55 act as a partition wall, separating the inner gas flow channel 90 from the outer gas flow channel 108. In the embodiment shown, the tubular shells 55 extend along a majority of the length of the driving shafts 66; however, it is appreciated that they can be shorter. The outer gas flow channels 108 are therefore defined between an outer peripheral surface of the tubular shells 55 and the inner surfaces 104 of the blade support sleeves 68. The tubular shells 55 extending upwardly from the inner surface 112 of the bottom wall of the organic matter-receiving container 54 and being covered by the blade support sleeves 68 prevent organic matter from entering into the gas-plenum chamber 40.

In an embodiment, the inner gas flow channel 90 and the outer gas flow channel 108 can be seen as an ascendent gas flow channel and a descendant gas flow channel respec-tively. In an embodiment, both gas flow channels 90, 108 are located in the grinding assemblies 69. They can be separated by a gas channel partition wall and/or the peripheral wall 88 of the drive shaft 66 if one of the gas flow channels extends therein. Thus, the grinding assemblies 69 define at least one gas flow channel extending longitudinally therein and pro-viding gas communication between the gas-plenum chamber 40 and the organic matter-receiving chamber 62 and in which gas, which can be heated gas, can flow.

Figure 7:
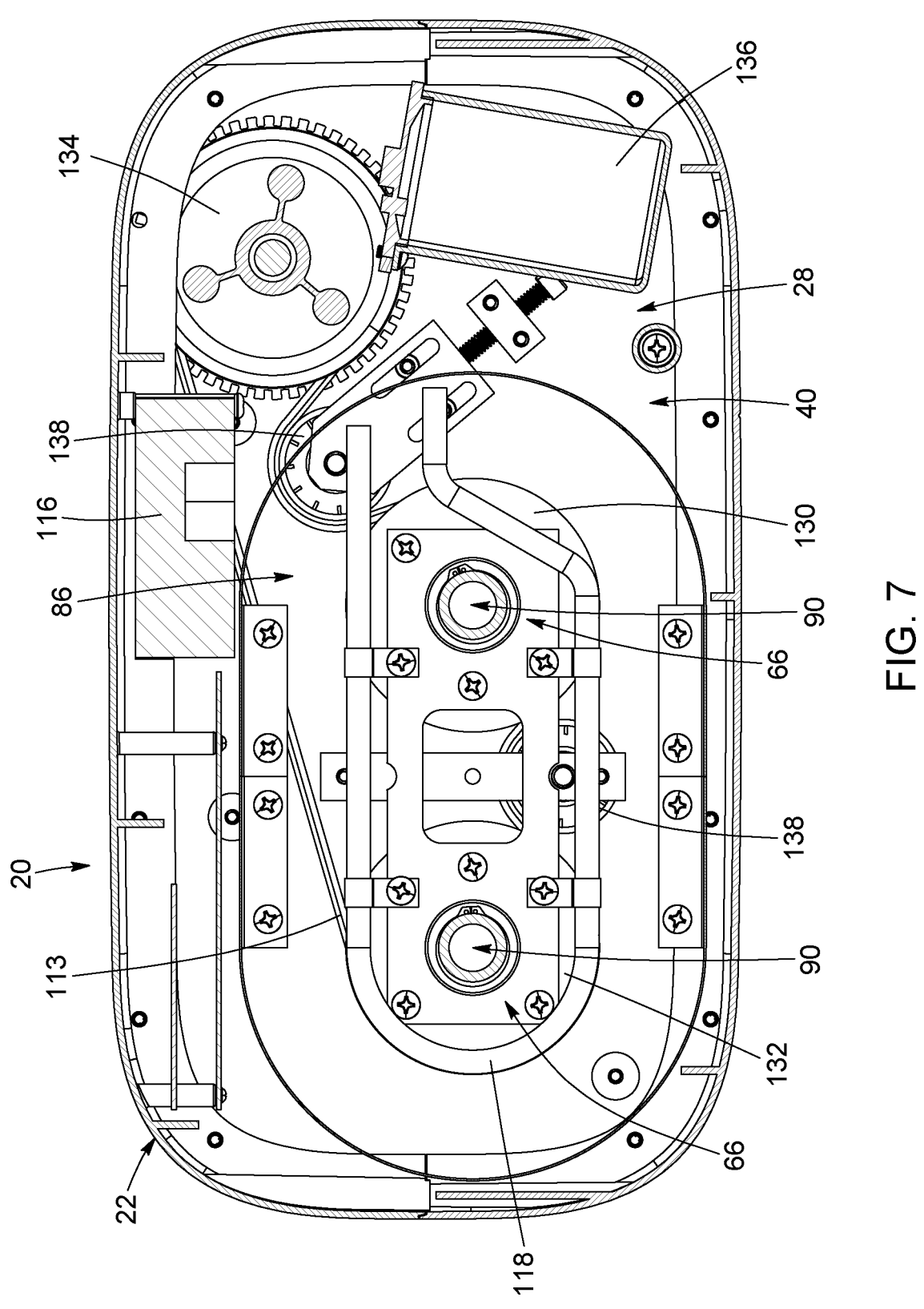
FIG. 7 is a sectional view taken along cross-section lines C-C of the organic waste processing device of FIG. 5.
Figure 8:
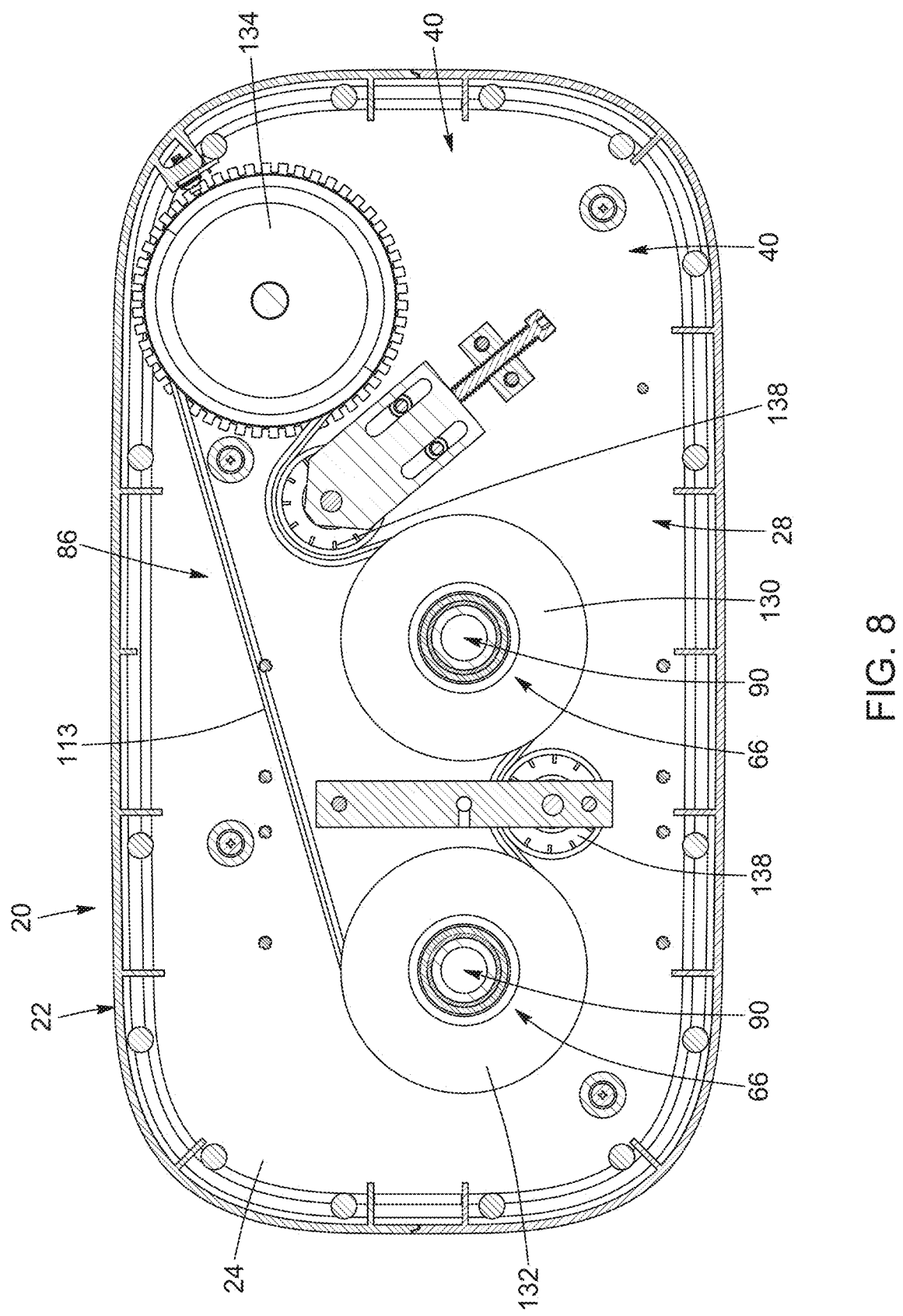
FIG. 8 is a sectional view taken along cross-section lines D-D of the organic waste processing device of FIG. 5.

Turning now to FIGS. 7 and 8, there is shown that the organic matter grinding-drying device 20 also includes a gas-propelling unit 116 and, more particularly, a gas-blow-ing unit, such as, and without being limitative, a fan, in gas communication with the gas-plenum chamber 40 and the at least one gas flow channel of the grinding assemblies 69, for instance the inner gas flow channels 90 and/or the outer gas flow channels 108. More particularly, in the non-limitative embodiment shown, the gas-propelling unit 116 is contained in the second sub-compartment 52 of the casing 22.

The gas-propelling unit 116 is configured to blow gas and, more particularly, air into the gas-plenum chamber 40 extending between the base 24 of the casing 22 and the bottom wall 58 of the organic matter-receiving container 54, i.e. the gas-propelling unit 116 is located upstream from the gas-plenum chamber 40 and the organic matter-receiving chamber 62. In the non-limitative embodiment shown, the inner gas flow channels 90 of the drive shafts 66 are opened in the gas-plenum chamber 40 and therefore, gas, and more particularly air, can flow therein, as detailed above. The gas-plenum chamber 40 is thus in gas communication with and being located between the gas-propelling unit and the at least one gas flow channel of the at least one grinding assembly along the at least one gas path of the organic matter grinding-drying device 20.

In an alternative embodiment, the gas-propelling unit can be a gas drawing unit configured to draw gas from the organic matter-receiving chamber 62 and thereby create a gas circulation in the organic matter grinding-drying device 20. In such embodiment, the gas-propelling unit is located downstream from the organic matter-receiving chamber 62. In still another embodiment, the organic matter grinding-drying device 20 can include a gas-blowing unit and a gas-drawing unit mounted respectively upstream and down-stream from the organic matter-receiving chamber 62.

As represented by the arrows in FIG. 3, in the closed configuration of the lid 36, gas/air exits the organic matter-receiving chamber 62, after contacting the organic matter contained therein, through the organic matter-receiving opening 64, located in an upper portion of the organic matter-receiving container 54, and then flows towards the gas-filtering assembly 56, entering in the inner chamber to contact the deodorizing agent, through the gas inlet port 80, exiting through the gas outlet port, and then outwardly of the casing 22.

To increase the drying efficiency, the organic matter grinding-drying device 20, also includes a heating unit 118 including, for instance and without being limitative, one or more heating elements, located in the gas-plenum chamber 40 and configured to heat the gas/air propelled by the gas-blowing unit 116. In some implementation, the gas/air is heated before it contacts the blade support sleeves 68 and, then, the organic matter contained in the organic matter-receiving chamber 62. In the non-limitative embodiment shown, the heating unit 118 is a gas-heating unit since gas is heated by conduction as it contacts the heating elements. In the non-limitative embodiment shown, the gas/air is heated before it flows into the at least one gas flow channel of the grinding assemblies 69 and, in the embodiment shown, in the inner gas flow channels 90 of the drive shafts 66. However, it is appreciated that, in an alternative and non-limitative embodiment, the drive shafts 66, for instance their peripheral wall 88, can be heated to heat the gas/air as it flows into the inner gas flow channels 90 and the outer gas flow channels 108.

In the embodiment shown, the organic matter contained in the organic matter-receiving chamber 62 is mainly heated by convection via the heated gas that flows into the chamber 62 through the rotatable grinding assemblies 69.

Returning now to FIG. 3, there is shown that, in this non-limitative embodiment, the organic matter grinding-drying device 20 further comprises a partition wall 74 separating the gas-plenum chamber 40 into two sections which are in gas communication. An upper section of the gas-plenum chamber 40, adjacent to the bottom wall 58 of the organic matter-receiving container 54 contains the heat-ing unit 118, shown in further details in FIG. 7, which is a cross-sectional view looking downward and taken from below the organic matter-receiving container 54 and above the heating unit 118 and the partition wall 74. The lower section, extending upwardly from the base 24 of the casing 22 contains at least partially the actuator assembly 86, shown in further details in FIG. 8. In the non-limitative embodiment shown, the lower section of the gas-plenum chamber 40 also contains the lower ends 84 of the drive shafts 66, including the gas ports.

It is appreciated that, in alternative embodiments (not shown), the gas-plenum chamber 40 can be free of partition wall separating the gas flow into two sub-gas flows. Alternatively, all the gas flow can be directed towards the heating unit 118, or any suitable alternative thereof. In the embodiment, the partition wall 74 extends along an entire surface area of the casing 22. However, it is appreciated that, in alternative embodiments (not shown), the partition wall can extend along only a portion thereof.

In the non-limitative embodiment shown, at least a portion of the gas/air blown by the gas-propelling unit 116 is directed above the partition wall 74 and contacts the heating unit 118. Thus, heated gas/air contacts the bottom wall 58 of the organic matter-receiving container 54. Therefore, the organic matter contained in the organic-matter-receiving chamber 62 is at least partially heated via heat conduction.

The heating unit 118 can be configured to heat gas and/or the organic matter-receiving container 54. In some implementations, the gas/air introduced in the organic matter-receiving chamber 62 can be at room temperature. In other implementations, the gas/air introduced in the organic matter-receiving chamber 62 can be a heated gas, i.e. a gas at a temperature higher than the room temperature.

The organic matter grinding-drying device 20 can further include a controller (not shown) operatively connected to the power button 42, the stand-by button 44, and the reset filter button 46 as well as the actuator assembly 86, the gas-propelling unit 116, and the heating unit 118. Thus, based on commands received via the power button 42, the stand-by button 44, and the reset filter button 46, the controller activates and adjusts the operating parameters of the actuator assembly 86, the gas-propelling unit 116, and the heating unit 118.

In some embodiments, it might be desirable to avoid direct contact between a heated element and the organic matter contained in the organic matter-receiving chamber 62. Therefore, it may be suitable to heat the gas/air flow before it contacts the organic matter. Therefore, in some embodiments, neither the organic matter-receiving container 54 nor the blade support sleeves 68 are directly heated.

An efficient heat transfer for drying the organic waste has been observed by injecting heated gas/air through the rotatable grinding assemblies 69, thereby lowering the energy cost and the cycle time, i.e. the time required to process (dry and grind) organic waste and transform same into a fertilizer.

Thus, still referring to FIG. 3, the gas/air flows along a gas/air flow path defined in the organic matter grinding-drying device 20 during operation thereof. More particularly, gas/air enters the casing 22 at room temperature through a gas/air entrance port defined in the casing 22 (indicated by arrow 114). In the non-limitative embodiment shown, the gas/air entrance port is defined in the peripheral wall 26 of the casing 22. Once inside the casing 22, i.e. in the internal compartment 28, gas/air is drawn towards the gas-propelling unit 116 and then blown by same into the gas-plenum chamber 40. In the non-limitative embodiment shown, the gas-propelling unit 116 blows gas/air into the upper and/or lower sections of the gas-plenum chamber 40. In the upper section, the gas contacts the heating unit 118 where it is heated by heat convection. The gas then flows towards the lower section of the gas-plenum chamber 40 wherein it enters into the gas flow channels of the grinding assemblies 69 and, more particularly, into the inner gas flow channels 90 of the drive shafts 66.

In the non-limitative embodiment shown, the gas/air entrance port is located on the peripheral wall 26 of the casing 22. The peripheral wall 60 of the organic matter-receiving container 54 is spaced-apart from the peripheral wall 26 of the casing 22, defining inbetween a peripheral wall spacing, therefore, air/gas at room temperature can flow inbetween, i.e. in the peripheral wall spacing, and cool the peripheral wall 60 of the organic matter-receiving container 54 by gas convection, thereby lowering the probabilities that organic matter remains attached (or sticks) to the peripheral wall 60 of the organic matter-receiving container 54 due to conduction heat transfer. Thus, gas/air at room temperature is drawn inside the internal compartment 28 by the gas-propelling unit 116 and flows into the peripheral wall spacing before reaching the the gas-propelling unit 116. It is appreciated that, in an alternative embodiment (not shown), the gas/air entrance port can be located elsewhere on the casing 22 or on the lid 36.

Thus, in gas-plenum chamber 40, the gas/air contacts the heating unit 118 before flowing into, sequentially, the inner gas flow channels 90 of the drive shafts 66, the apertures 92, the outer gas flow channels 108, and then the organic matter-receiving chamber 62. As the gas/air flows upwardly into the organic matter-receiving chamber 62, it dries the organic matter contained therein. As mentioned above, in the closed configuration of the lid 36, gas/air exiting the organic matter-receiving chamber 62 flows towards the gas-filtering assembly 56, entering in the inner chamber of the gas-filtering assembly 56 to contact the deodorizing agent, through the gas inlet port 80, exiting through the gas outlet port, and then outwardly of the casing 22 through a gas/air outlet port defined in the casing 22 (indicated by arrow 122). In some embodiments including the gas-filtering assembly 56, the gas/air flow exiting the organic matter grinding-drying device 20 is substantially odor-free.

Now referring to FIG. 8, a non-limitative embodiment of the actuator assembly 86 of the organic matter grinding-drying device 20 will be described. FIG. 8 is a cross-sectional view looking downward and taken from below the organic matter-receiving container 54, below the partition wall 74, and above at least a portion of the actuator assembly 56. As mentioned above, the actuator assembly 86 is at least partially located between the base 24 of the casing 22 and the bottom wall 58 of the organic matter-receiving container 54, in the gas-plenum chamber 40 and, more particularly, in the lower portion thereof. Lower sections of the drive shafts 66 are operatively coupled to the actuator assembly 86 and the actuator assembly 86 is configured to engage the drive shafts 66 in rotation.

The actuator assembly 86 is operatively connected to the rotatable grinding assemblies 69 and, more particularly, the drive shafts 66 to engage same in rotation upon actuation of the organic matter grinding-drying device 20 and, thereby, grind/shred the organic matter contained in the organic matter-receiving chamber 62.

In the non-limitative embodiment shown, the actuator assembly 86 includes a motor 136 (FIG. 7) connected to a power supply (not shown), a driving gear 134 engaged in rotation by the motor, a belt or a chain 113 engaged with the driving gear 134, and driven pulleys 130, 132 (two in the embodiment shown, each one being operatively connected to a respective one of the drive shafts 66). Thus, the driven pulleys 130, 132 are operatively connected to the driving gear 134 through the belt/chain 113.

The actuator assembly 86 further includes two idler pulleys 138 to tension the belt/chain 113 along its path. Thus, the drive shafts 66 are engaged in rotation by the actuator assembly 86, which may differ from the embodiment shown in the figures and described above.

It is appreciated that the components of the organic matter grinding-drying device 20 (or organic waste processing device) can be made of any suitable materials. For instance, and without being limitative, the casing 22 can be made of polymer with high impact resistance, low cost, and low heat conductivity. Examples of polymers meeting such requirements include ultra-high molecular weight polyethylene (UHMWPE), polypropylene (PP), polycarbonate (PC), and polymethylmethacrylate (PMMA), also known as "Plexiglas".

For instance, and without being limitative, the organic matter-receiving container 54 can be made of a corrosion resistant alloy. Examples of corrosion resistant alloys which can be used include austenitic stainless steel (e.g., 304 L, 316 L), duplex stainless steel, martensitic stainless steel, Nickel 200, Monel alloys, Inconel alloys, etc.

For instance, and without being limitative, the deodorizing agent, which can be contained in the gas-filtering housing 72, can be active carbon, although other deodorizing agents such as baking soda or silicon dioxide coated with copper with high specific surface area ($\geq 100$ m2/g according to BET method) can also be used.

Using the above-described organic matter grinding-drying device 20, there is also provided a method for grinding and drying waste organic matter contained in the organic matter-receiving chamber 62. The method comprising: adding waste organic matter into the organic matter-receiving chamber 62, simultaneously grinding the waste organic matter by engaging in rotation at least one grinding assembly having at least one blade mounted thereon and drying the waste organic matter while it is grinded by injecting gas, which can be an heated gas, into the organic matter-receiving chamber through the at least one grinding assembly. As mentioned above, the gas can be heated before being injected into the organic matter-receiving chamber. In an embodiment, the grinding assembly(ies) is(are) engaged in rotation at a speed sufficient to grind the waste organic matter contained in the organic matter-receiving chamber. It is appreciated that the organic matter grinding and drying can be carried out simultaneously during only a portion of the waste organic matter processing.

The organic matter-receiving chamber 62 can be filled with a volume of waste organic matter comprised between about 5% and about 90% of a total volume of the organic matter-receiving chamber 62 to ensure proper usage of the organic matter grinding-drying device 20.

In embodiment, the grinding and drying process of the waste organic matter contained in the organic matter-receiving chamber 62 can be carried out during a process cycle having a duration comprised between about 150 minutes and about 1440 minutes (24 hours). In another embodiments, the process cycle has a duration comprised between about 150 minutes and about 480 minutes. The duration of the process cycle can be varied in accordance with the volume of waste organic matter contained in the organic matter-receiving chamber 62 or other process variables including but without being limited to the gas flow rate, the gas temperature, and the rotation speed of the grinding assemblies, and the like.

In an embodiment, the grinding assembly(ies) is(are) engaged in a rotation intermittently while gas, which can be heated gas, is blown therein. In an embodiment, during one or more portions of the process cycle, the gas blown in the grinding assembly(ies) can be at ambient temperature. In one or more other portions of the process cycle, the gas blown in the grinding assembly(ies) is heated gas. It is appreciated that the temperature of gas blown in the grinding assembly(ies) can be varied during the process cycle.

The grinding assembly(ies) is(are) being engaged in a rotation with a rotational speed being comprised between about 10 rpm and about 150 rpm.

In an embodiment, as described above, the method comprises injecting a heated gas in the organic matter-receiving chamber 62. In such an embodiment, the heating unit 18 is operational for most of the duration of the process cycle. In an embodiment, gas at ambient temperature is injected in the organic matter-receiving chamber 62 at the end of the process cycle to allow some time for the waste organic matter to cool down before withdrawing the product from the organic matter-receiving chamber 62.

In an embodiment, gas having a temperature comprised between about 35° C. and about 110° C. can be injected inside of the organic matter-receiving chamber 62. The gas/air flow rate flowing in the gas path can be comprised between about 1 CFM and about 10 CFM.

In an embodiment, the gas-propelling unit 116 such as and without being limitative, is in operation during an integrality of the process cycle.

As mentioned above, the organic matter-receiving container 54 is removably insertable in the internal compartment 28 of the casing 22 and the blade support sleeves 68 are removably mounted to a respective one of the drive shafts 66. Therefore, to either clean the organic matter-receiving chamber 62 or to remove processed particular material at the end of the grinding and drying process, the organic matter-receiving container 54 can be removed from the internal compartment 28 of the casing 22. In the non-limitative embodiment shown, the blade support sleeves 68 can first be disengaged from their drive shafts 66 and removed from the organic matter grinding-drying device 20 and, then, the organic matter-receiving container 54 can be disengaged from the casing 22 and removed from the internal compartment 28, using, for instance, the handle 70. Once emptied and/or cleaned, the organic matter-receiving container 54 can be reinserted into the internal compartment 28 of the casing 22 with the drive shafts 66 extending into the organic matter-receiving chamber 62 through the apertures 76 defined through the bottom wall 58 of the organic matter-receiving container 54. Then, the blade support sleeves 68 can be inserted onto their respective drive shaft 66 and engaged therewith, for instance through the snap-fit connection 124. Once engaged together, the blade support sleeves 68 and the drive shafts 66 rotate simultaneously, the blade support sleeves 68 being engaged in rotation by their respective drive shaft 66.

Referring to FIGS. 9 to 15, there is shown an alternative embodiment of the organic matter grinding-drying device 20 wherein the features are numbered with reference numerals in the 200 and 300 series which correspond to the reference numerals of the previous embodiment.

Figure 9:
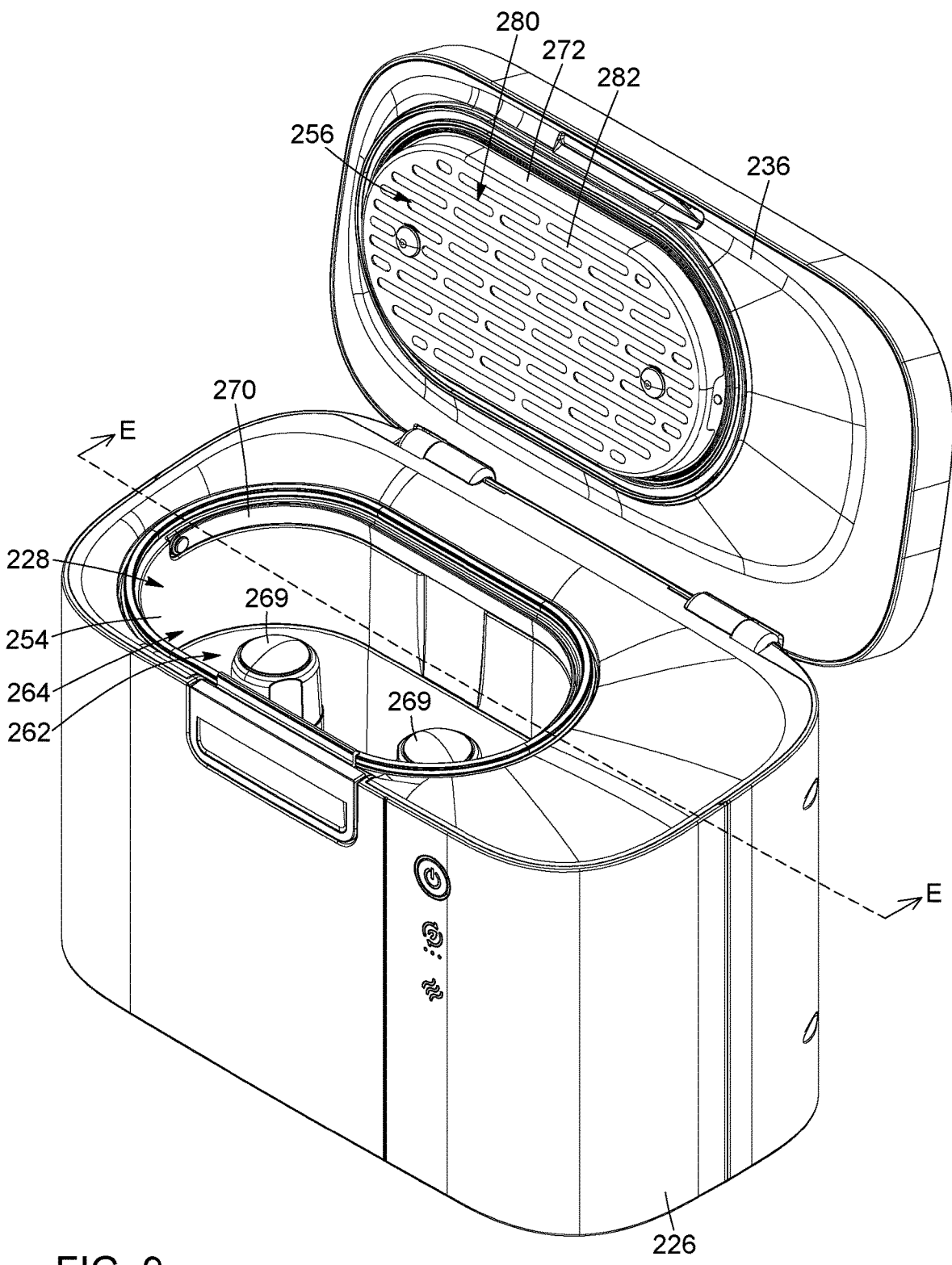
FIG. 9 is top and front perspective view of an organic waste processing device, in accordance with another embodiment, wherein a lid is configured in an open configuration and including a gas-filtering assembly located in the lid.
Figure 10:
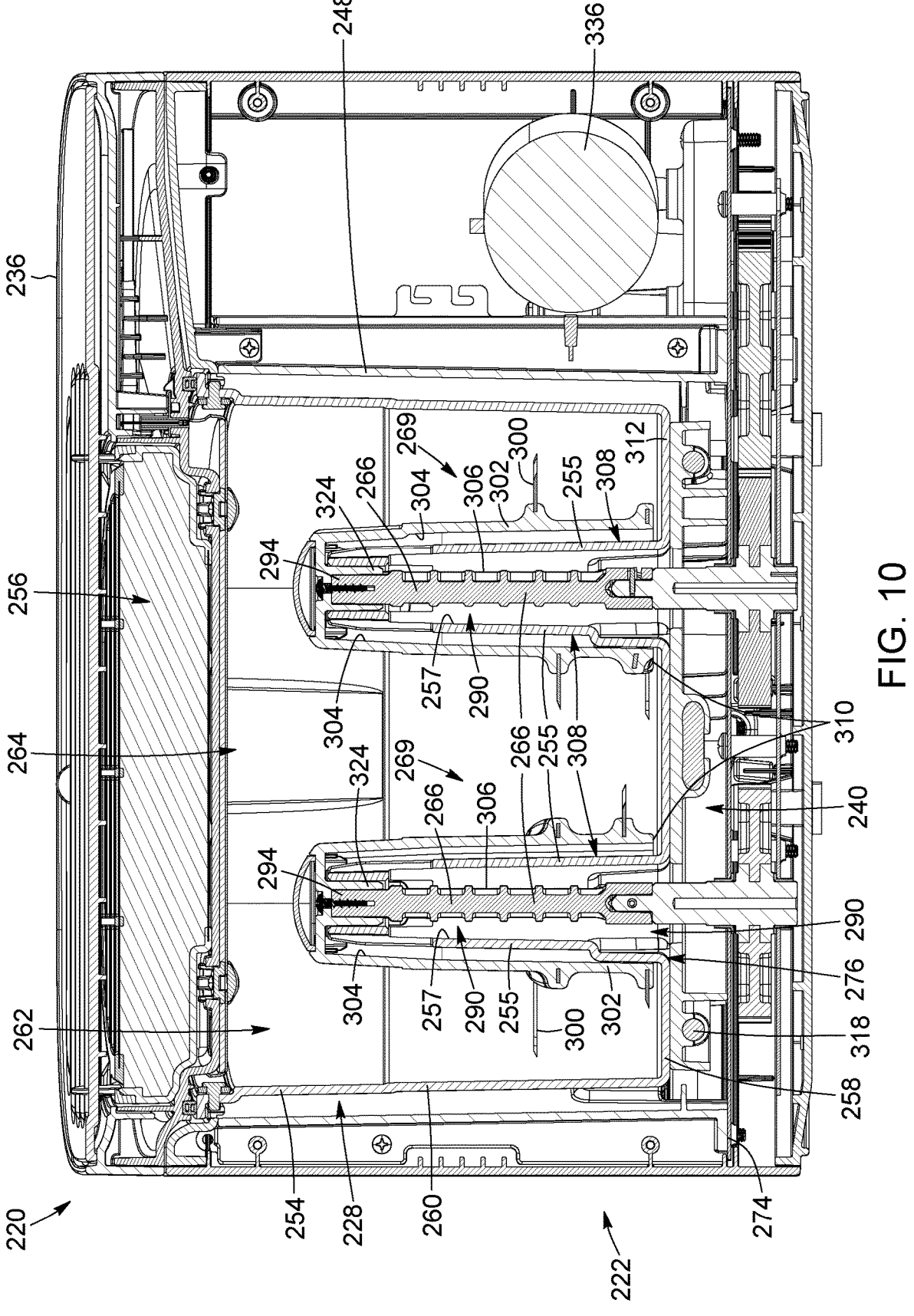
FIG. 10 is a sectional view taken along cross-section lines E-E of the organic waste processing device of FIG. 9.
Figure 11:
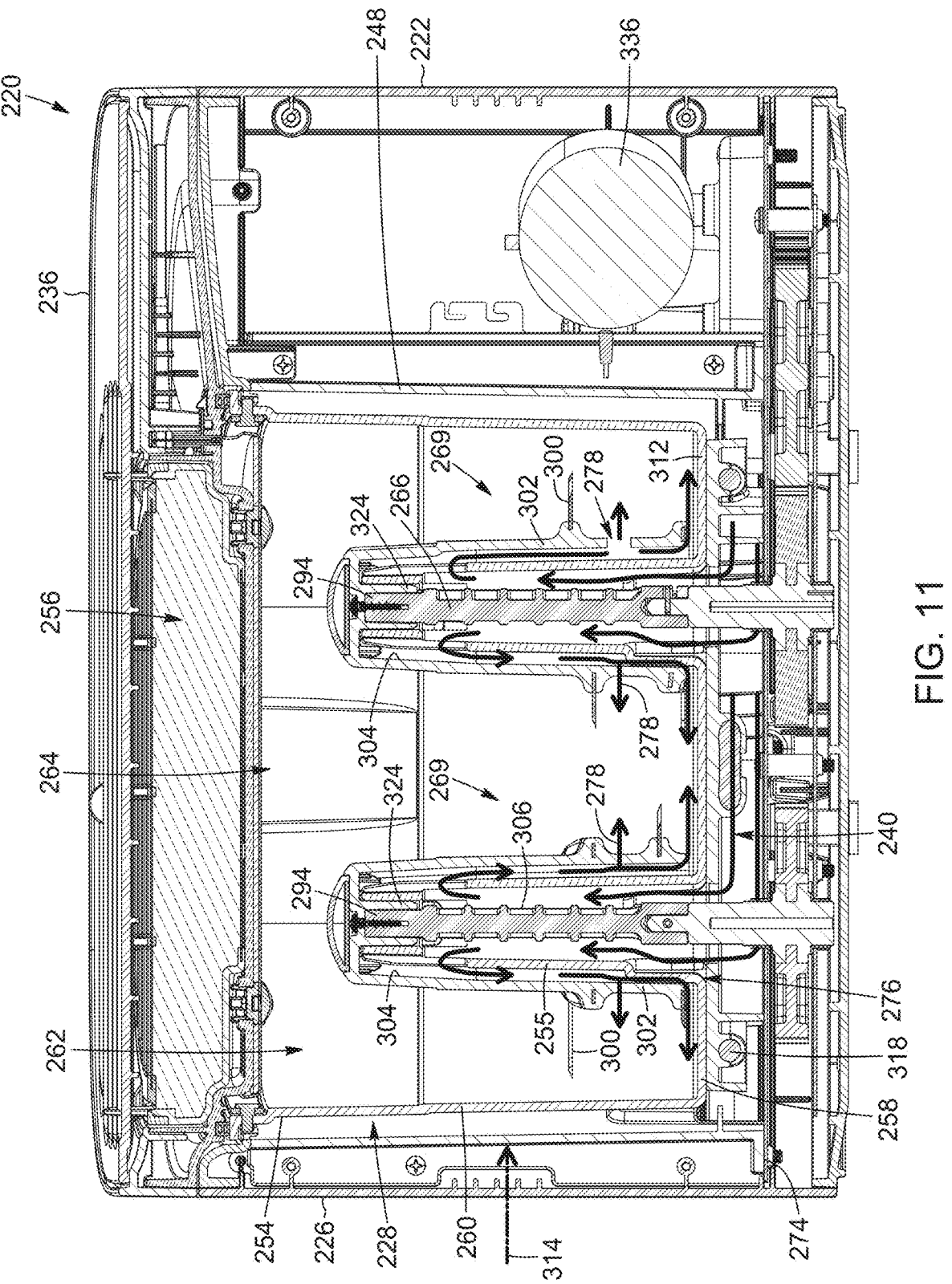
FIG. 11 is a cross-sectional view of the organic waste processing device of FIG. 9, including arrows depicting a gas path within the organic waste processing device.

Referring to FIG. 9, there is shown, that the organic matter grinding-drying device 220 is mostly similar to the organic matter grinding device 20 except for the gas-filtering assembly 256, which is located inside the lid 236 and above the organic matter-receiving opening 264 of the organic matter-receiving container 254. As the gas-filtering assembly 56, it comprises a gas-filter housing 272 mounted to and protrudes from an inner surface of the lid 236. The gas-filtering housing 272 is contained in the organic matter-receiving chamber 262 in the closed configuration of the lid 236, as shown in FIGS. 10 and 11. More particularly, the gas-filtering housing 272 is essentially in register with the organic matter-receiving opening 264 and closes the organic matter-receiving chamber 262 in the closed configuration of the lid 236.

A lower surface, i.e. the one exposed inside the organic matter-receiving chamber 262 in the closed configuration of the lid 236, comprises a gas inlet port 280 with an obstruction grid 282 extending therethrough. Thus, the gas-filtering assembly 256 is in gas communication with the organic matter-receiving chamber 262 in a manner such that gas exiting the organic matter-receiving chamber 262 is drawn into the gas-filtering assembly 256 before being expelled through the gas outlet port (not shown). In a non-limitative embodiment, the gas outlet port is located on top of the lid 236, and above the organic matter-receiving opening 264 and in gas communication therewith. The gas-filtering assembly 256 can contain a deodorizing agent. Therefore, a gas/air stream can flow into the inner chamber and contact the deodorizing agent contained therein in a manner such that the organic matter grinding-drying device 220 can expel a substantially odor-free gas.

Thus, in a non-limitative embodiment, in its closed configuration, the lid 236 is engaged with the casing 222 and/or the organic matter-receiving container 254. More particularly, it can be sealingly engaged with at least one of the casing 222 and/or the organic matter-receiving container 254, with a sealed (mounted to the lid 236, the casing 222 and/or the organic matter-receiving container 254) to prevent gases from escaping the organic matter grinding-drying device 220 before flowing through the gas-filtering assembly 256. The lid includes the gas inlet port 280 in gas communication with the organic matter-receiving chamber 262, through the organic matter-receiving opening 264, and the gas outlet port to expel gas outwardly of the organic matter grinding-drying device 220. Thus, when the lid 236 closes the organic matter-receiving chamber 262, gas blown into the organic matter-receiving chamber 262, adjacent to the bottom wall 258 thereof, are withdrawn from the organic matter-receiving chamber 262 in an upper portion thereof and, more particularly, through the organic matter-receiving opening 264 and the lid 236, before being expelled outwardly of the organic matter grinding-drying device 220.

Figure 15:
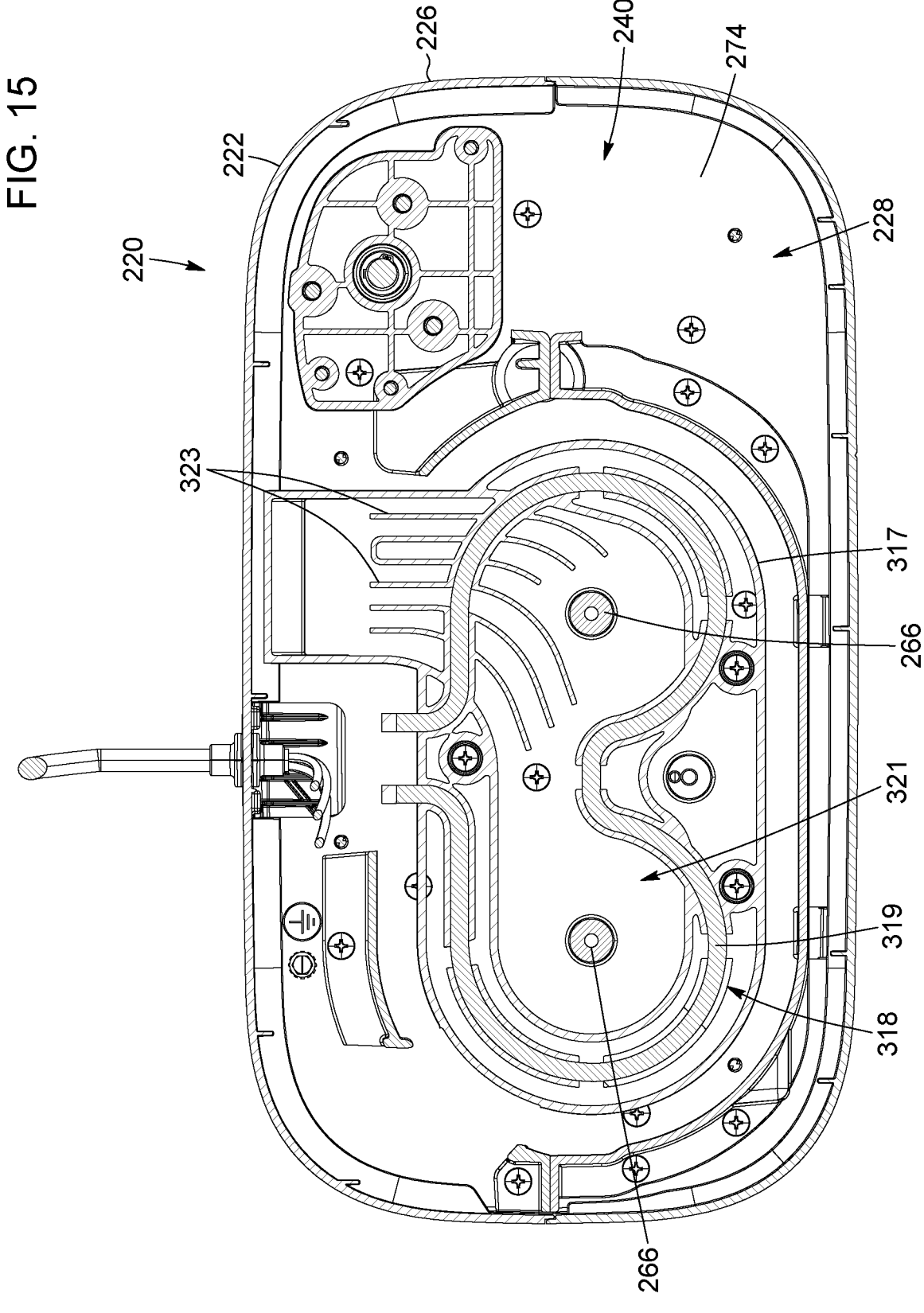
FIG. 15 is a sectional view taken along cross-section lines G-G of the organic waste processing device of FIG. 13.

Referring to FIG. 15, there is shown that the air/gas flow path inside the organic matter grinding-drying device 220 is slightly different, mostly when flowing in the gas-plenum chamber 240. As for the organic matter grinding-drying device 20, the air/gas enters inside the internal compartment 228 of the casing 222 at room temperature through an gas/air entrance port defined in the peripheral wall 226 of the casing 222 (indicated by arrow 314). The air/gas flows between the peripheral wall 226 of the casing 222 and the peripheral wall 260 of the organic matter-receiving container 254, cooling the peripheral wall 260 of the container 254 by convection, drawn by the blowing unit 316. Then, the air/gas flow through the blowing unit 316 (FIG. 14) and is propelled towards the heating unit 318, the grinding assemblies 269, and the organic matter-receiving chamber 262 sequentially.

Figure 16:
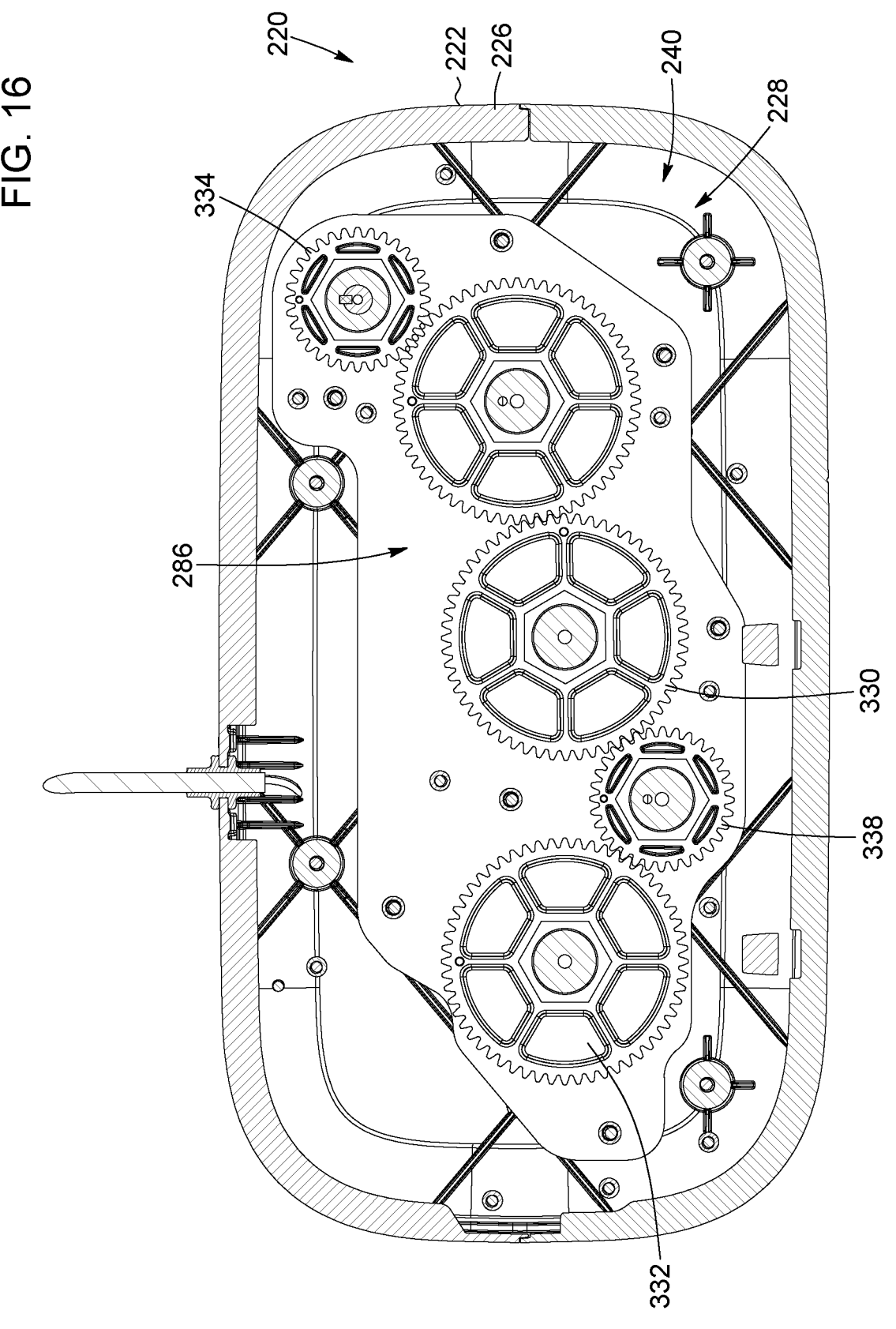
FIG. 16 is a sectional view taken along cross-section lines H-H of the organic waste processing device of FIG. 13.

As for the embodiment shown above in reference to FIGS. 1 to 8, the organic matter grinding-drying device 220 includes a partition wall 274 separating the heating unit 218 from the actuator assembly 286 (FIG. 16). The heating unit 318 includes a heating element 319 surrounded by a partition wall 317 delimiting a gas heating chamber 321 around the heating element 319. Inside the gas heating chamber 321, a plurality of fins 323 extends upwardly from the partition wall 274 and divides the gas/air flow to promote heat transfer with the heating element 319. It is appreciated that the shape, the number and the configuration of the heating unit 318, including the heating element(s) 319, the gas heating chamber 321, and the fins 323, can vary from the embodiment shown in FIG. 16.

Referring back to FIG. 11, there is shown that the gas flow path in the organic matter grinding-drying device 220, after flowing through the heating unit 318 is substantially similar to the one described above in reference to the embodiment shown in FIGS. 1 to 8. The heated gas/air flows into the inner gas flow channels 290 of the drive shafts 266, then, into the outer gas flow channels 308 defined between the outer peripheral surface 306 of the drive shafts 266 and the inner surfaces 304 of the blade support sleeves 268, and exit through the spacings defined between the lower end 310 of the blade support sleeves 268 and the inner face 312 of the bottom wall 258 of the organic matter-receiving container 254 to provide a gas flow, particularly for drying the organic matter contained in the organic matter-receiving chamber 262, as shown in FIG. 11. In the embodiment shown in FIGS. 9 to 16, the peripheral wall 302 of the blade support sleeves 268 also includes apertures 278 (FIG. 11) extending therethrough and above the lower end 310, through which the heated air/gas can flow and contact the organic matter contained in the organic matter-receiving chamber 262.

In the organic matter-receiving chamber 262, the heated gas/air flows upwardly towards the organic matter-receiving opening 264 of the organic matter-receiving container 254 and, then, into the gas-filtering assembly 256, which is located inside the lid 236 and above the organic matter-receiving opening 264, to finally be expelled outwardly of the organic matter grinding-drying device 220.

Turning now to FIG. 16, there is shown that the actuator assembly 286 of the organic matter grinding-drying device 220 includes a combination of toothed wheels (driving and driven gears) 330, 332, 334, 338 and a chain (not shown) operatively engaged together, instead of the wheels and belt of the actuator assembly 86. The toothed wheels are engaged in rotation by the motor 336 (FIGS. 10 and 11).

Figure 12:
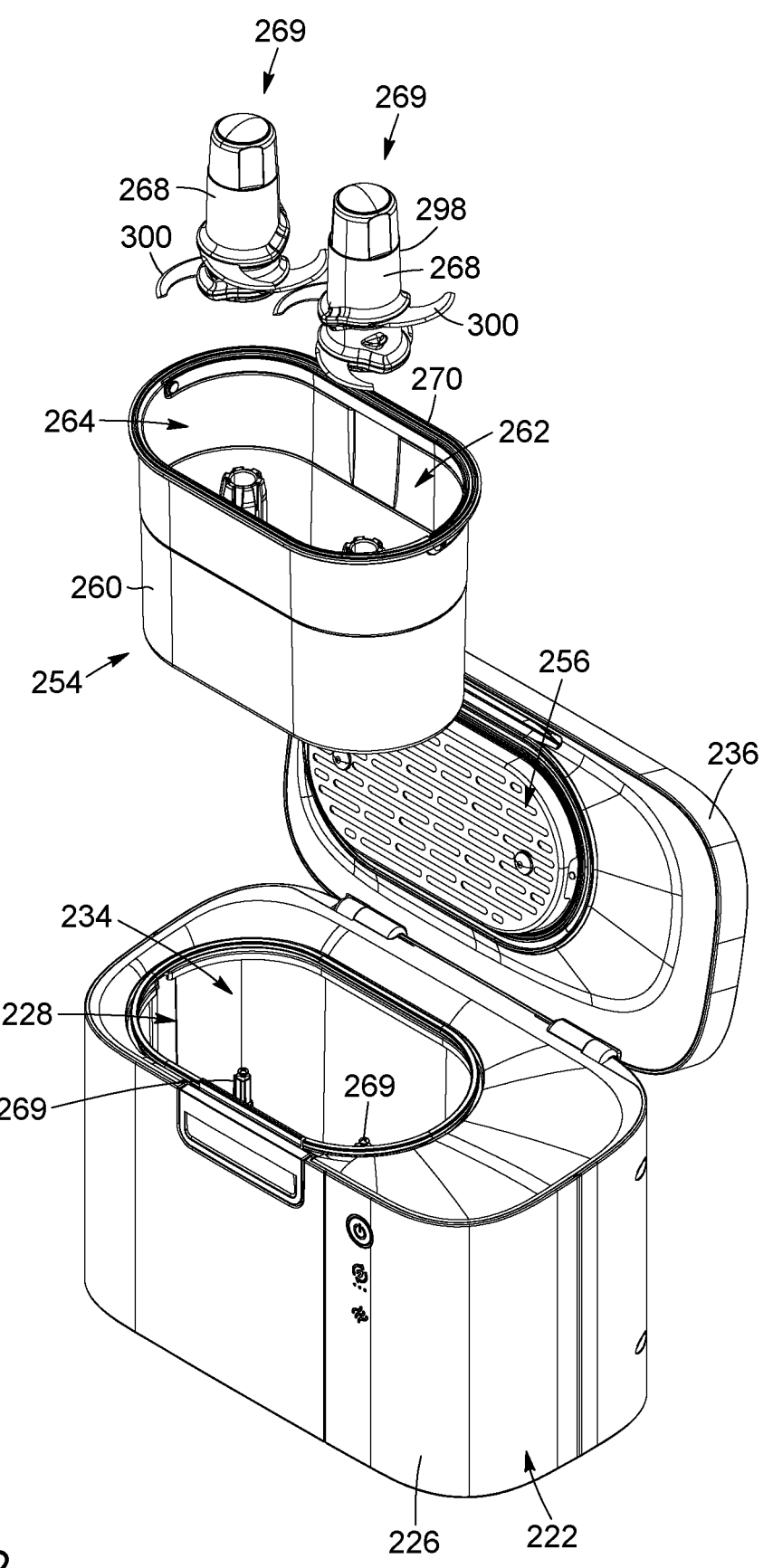
FIG. 12 is a front perspective view of the organic waste processing device shown in FIG. 9 showing at least some removable components withdrawn from a casing.
Figure 13:
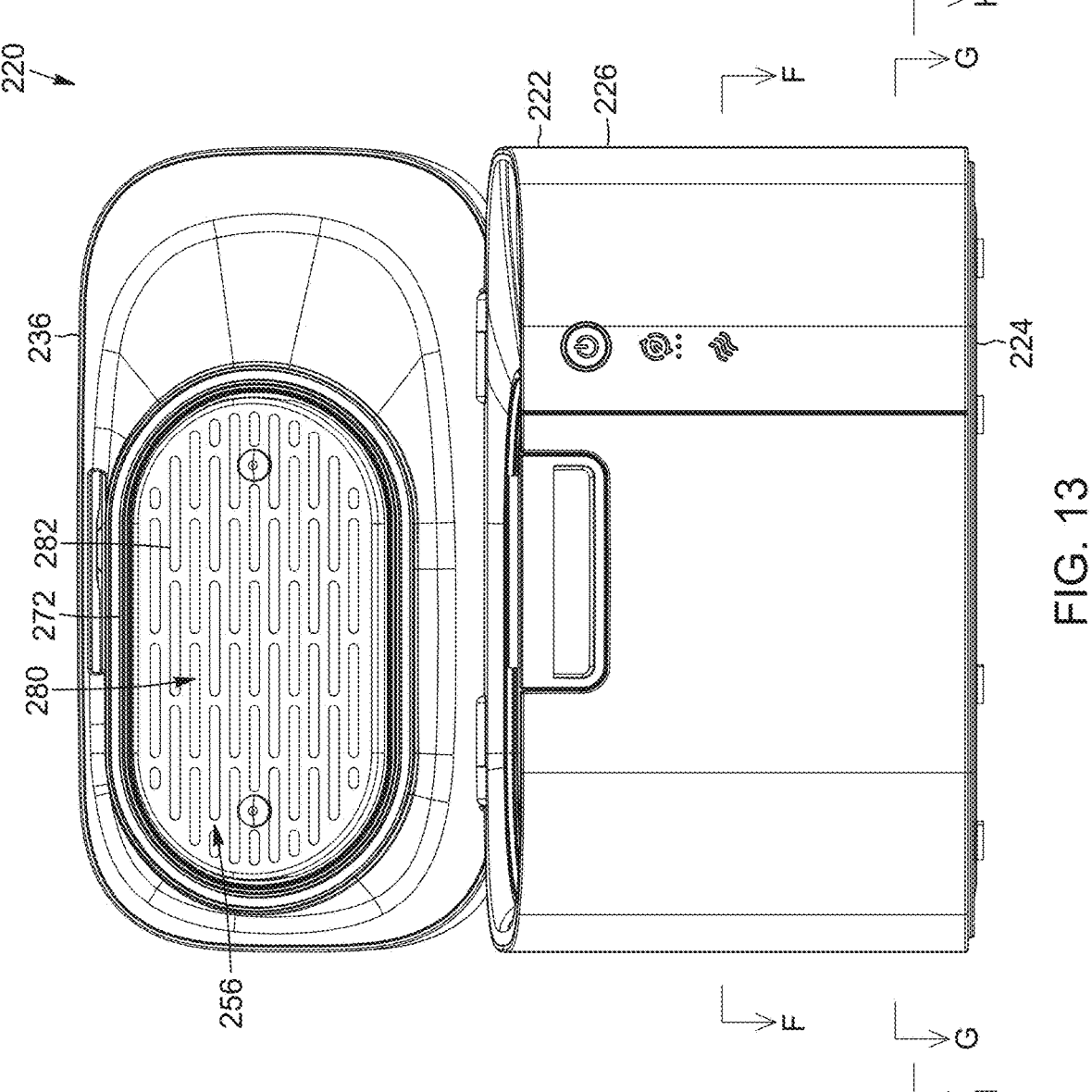
FIG. 13 is a front elevation view of the organic waste processing device of FIG. 9.
Figure 14:
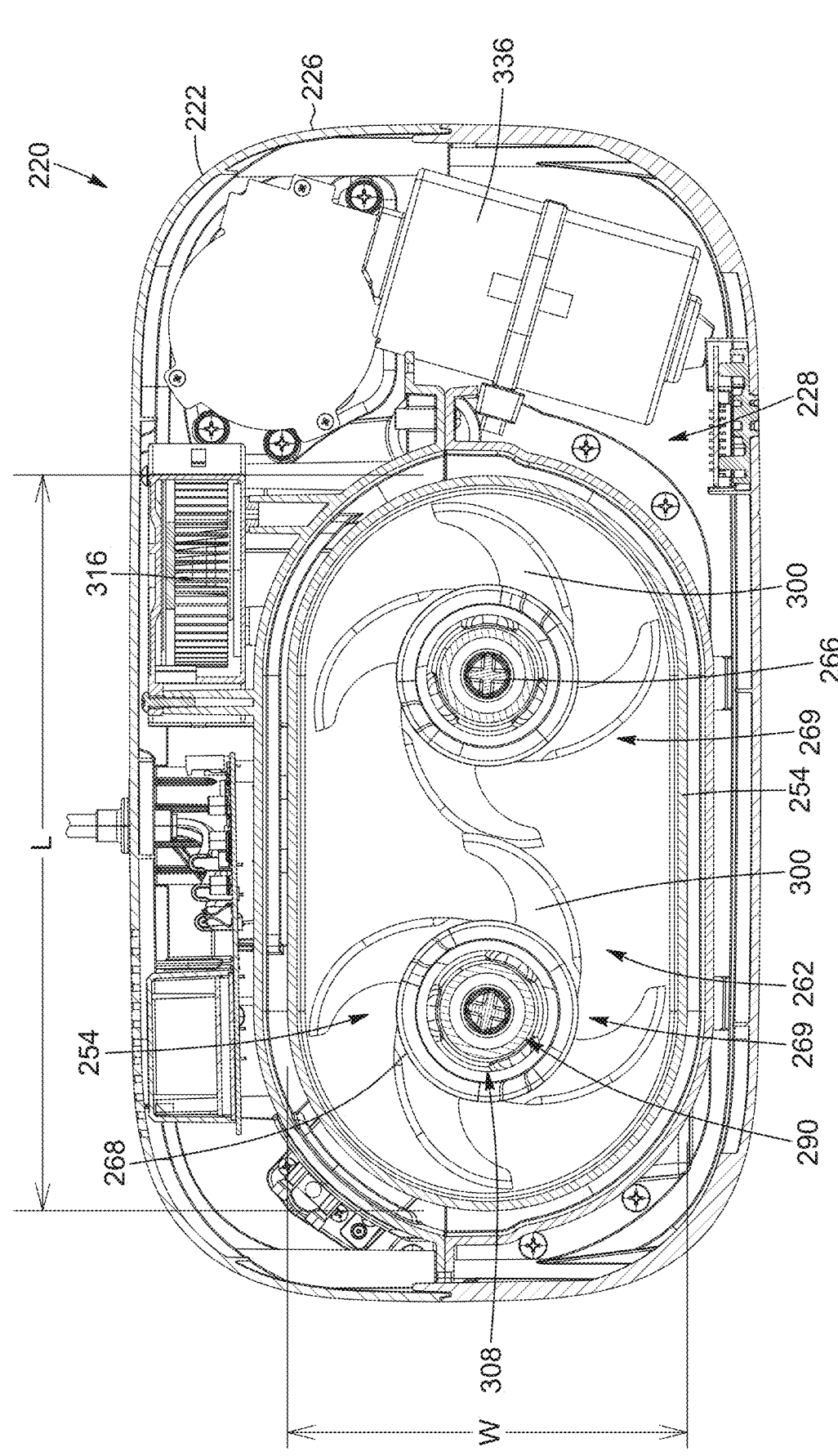
FIG. 14 is a sectional view taken along cross-section lines F-F of the organic waste processing device of FIG. 13.

Referring now to FIGS. 9 to 11, there is shown that the rotatable blade support sleeves 268 are connected to the respective one of the drive shafts 266 through a snap-fit connection 324 provided at or in proximity of their upper ends, in the upper sections 294 of the drive shafts 266. The design and the configuration of the snap-fit connection 324 differs from the one included in the embodiment shown and described in reference to FIGS. 1 to 8. Both snap-fit connections 124, 324 allow, for cleaning purposes, to disengage the rotatable blade support sleeves 268 from their respective drive shaft 266, as shown in FIGS. 4 and 12, and to be reengaged therewith. When engaged together, the rotatable blade support sleeves 268 are secured to their respective drive shaft 266, i.e. they cannot rotate relative to their drive shaft 266 but are engaged in rotation simultaneously therewith. Therefore, the blades 300 are also engaged in rotation simultaneously with the drive shaft 266 through the rotatable blade support sleeve 268 to grind/shred the organic matter contained in the organic matter-receiving container 254.

Referring to FIGS. 10 and 11, there is shown that the organic matter-receiving container 254 also comprises two spaced-apart tubular shells 255 extending upwardly from the bottom wall 258 wherein each one of the tubular shells 255 is associated to a respective one of the rotatable grinding assemblies 269. While in the embodiment shown in FIGS. 1 to 8, the inner gas flow channel 90 is defined centrally of the drive shafts 66 with their outer peripheral surface 106 being juxtaposed to an inner peripheral surface 57 of the tubular shells 55, in the embodiment shown in FIGS. 10 and 11, the inner gas flow channel 290 is defined between the outer peripheral surface 306 of the drive shafts 266 and the inner peripheral surface 257 of the tubular shells 255. Thus, the tubular shells 255 act as a partition wall between the inner gas flow channel 290 and the outer gas flow channel 308. As the blade support sleeves 268 engage and connect with the drive shafts 266 in the upper sections thereof and the tubular shells 255 are shorter in length than the drive shafts 266, gas communication is provided between the inner gas flow channel 290 and the outer gas flow channels 308. More particularly, the inner gas flow channel 290 and the outer gas flow channel 308 are in gas communication above an upper free end of the tubular shells 255 acting as a partition wall. In turn, the outer gas flow channels 308 are defined between an outer peripheral surface of the tubular shells 225 and the inner surfaces 304 of the blade support sleeves 268. Once again, the tubular shells 255, extending upwardly from the inner surface 312 of the bottom wall of the organic matter-receiving container 254 and being covered by the blade support sleeves 268, prevent organic matter from entering into the gas-plenum chamber 240.

In the embodiment of FIGS. 9 to 16, the gas port opened in the gas-plenum chamber 240 is a portion of the apertures 276 defined in the bottom wall 258 of the organic matter-receiving container 254. More particularly, gas communication is provided by the portion of the apertures 276 surrounding the drive shafts 266 and extending outwardly therefrom. As for the above-described embodiment, the drive shafts 266 extend through the apertures 276 from the gas-plenum chamber 240 and into the organic matter-receiving container 254. A lower portion of the tubular shells 255 is in register with the apertures 276 and also delimits the gas/air port providing fluid communication between the gas-plenum chamber 240 and the grinding assemblies 269.

In the above-described embodiments, the grinding assemblies 69, 269 provide gas communication between the gas-plenum chamber 40, 240 and the organic matter-receiving chamber 62, 262 through at least one gas flow channel. More particularly, both embodiments include the inner gas flow channel 90, 290 and an outer gas flow channel 108, 308, located downstream of the inner gas flow channel 90, 290. It is appreciated that the inner gas flow channel 90, 290 can be qualified as an ascending gas flow channel in which gas flows upwardly from the gas-plenum chamber 40, 240 into the grinding assemblies 69, 269 while the outer gas flow channel 108, 308 can be qualified as a descending gas flow channel in which gas flows downwardly to be introduced into the organic matter-receiving chamber 62, 262. It is appreciated that, in alternative embodiments (not shown), the gas can flow downwardly in the inner gas flow channel and upwardly in the outer gas flow channel. Furthermore, the grinding assemblies 69, 269 can include a single gas flow channel in which gas flows either upwardly or downwardly. The grinding assemblies 69, 269 can include more than two gas flow channels separated by partition walls, either the peripheral wall of the drive shaft or other partition wall(s).

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. An organic waste processing device comprising:
   a casing including a base and a peripheral wall, extending upwardly from the base, and defining together an internal compartment, the casing having a gas-plenum chamber defined therein;
   an organic matter-receiving container insertable in the internal compartment of the casing and having a bottom wall and a peripheral wall extending from the bottom wall and defining together an organic matter-receiving chamber;
   a gas-propelling unit in gas communication with the gas-plenum chamber; and
   at least one grinding assembly at least partially contained in the organic matter-receiving chamber, each one of the at least one grinding assembly comprising:
   a drive shaft having an outer peripheral surface; and
   a rotatable blade assembly including a blade support sleeve mounted to the drive shaft and being engaged in rotation therewith, said blade support sleeve having a peripheral wall with an inner surface and a sleeve outer peripheral surface and the rotatable blade assembly further includes comprises at least one blade mounted to the blade support sleeve and extending outwardly from said sleeve outer peripheral surface into the organic matter-receiving chamber, the inner surface of the blade support sleeve being spaced-apart from the outer peripheral surface of the drive shaft to define at least one gas flow channel extending longitudinally into the at least one grinding assembly and providing gas communication between the gas-plenum chamber and the organic matter-receiving chamber; and
   wherein the at least one gas flow channel comprises an ascending gas flow channel and a descending gas flow channel surrounding the ascending gas flow channel with a partition wall extending inbetween;
   the drive shaft is located centrally inside the ascending gas flow channel and the partition wall surrounds the drive shaft, the drive shaft being spaced-apart thereof with the ascending gas flow channel extending inbetween;
   the ascending gas flow channel and the descending as flow channel are in fluid communication above an upper free end of the partition wall; and
   the partition wall comprises a tubular shell extending upwardly from the bottom wall of the organic matter-receiving container and preventing organic matter contained in the organic matter-receiving chamber to enter into the gas-plenum chamber.

2. The organic waste processing device as claimed in claim 1, wherein the organic matter-receiving container is removably insertable in the internal compartment of the casing with the bottom wall of the organic matter-receiving container being spaced-apart from the base of the casing to define the gas-plenum chamber inbetween and in gas communication with the gas-propelling unit and the at least one gas flow channel of the at least one grinding assembly, the gas-propelling unit generating a gas flow from the gas-plenum chamber towards the organic matter-receiving container and through the at least one gas flow channel of the at least one grinding assembly.

3. The organic waste processing device as claimed in claim 1, further comprising a gas-heating unit at least partially contained in the gas-plenum chamber and configured to heat the gas propelled by the gas-propelling unit while flowing into the gas-plenum chamber, the gas-heating unit having one or more heating elements.

4. The organic waste processing device as claimed in claim 1, wherein the gas-propelling unit circulates a gas flow along a gas flow path defined in the organic waste processing device, the gas flow path including sequentially the gas-plenum chamber, the at least one gas flow channel extending longitudinally into the at least one grinding assembly, and the organic matter-receiving chamber, wherein the organic waste processing device further comprises a gas-filtering assembly mounted downstream of the organic matter-receiving container in the gas flow path.

5. The organic waste processing device as claimed in claim 1, further comprising a lid engageable with at least one of the casing and the organic matter-receiving container, the lid comprising a gas inlet port in gas communication with the organic matter-receiving chamber and a gas outlet port to expel gas outwardly of the organic waste processing device and wherein the lid is sealed to the at least one of the casing and the organic matter-receiving container in a closed configuration thereof.

6. The organic waste processing device as claimed in claim 1, wherein the drive shaft of the at least one grinding assembly extends through an aperture defined in the bottom wall of the organic matter-receiving container and the organic waste processing device further comprises an actuator assembly at least partially located between the base of the casing and the bottom wall of the organic matter-receiving container and wherein the drive shaft comprises a lower section operatively coupled to the actuator assembly to be engaged in rotation.

7. The organic waste processing device as claimed in claim 1, wherein the at least one gas flow channel is in gas communication with the organic matter-receiving chamber at least through a spacing defined between a lower end of the peripheral wall of the blade support sleeve and the bottom wall of the organic matter-receiving container.

8. The organic waste processing device as claimed in claim 1, wherein the at least one grinding assembly comprises more than one grinding assembly, spaced-apart from one another in the organic matter-receiving container and extending upwardly from the bottom wall of the organic matter-receiving container.

9. The organic waste processing device as claimed in claim 1, wherein the blade support sleeve is removably mounted to the drive shaft.

10. The organic waste processing device as claimed in claim 1, wherein the at least one grinding assembly comprises at least two grinding assemblies and the at least one blade of each one of the at least two grinding assemblies is engageable in rotation to cover a blade cutting path, the blade cutting paths of two of the at least two grinding assemblies overlapping each other.

11. The organic waste processing device as claimed in claim 1, wherein the organic matter-receiving container has a substantially elliptical cross-section with a length and a width, and the length of the organic matter-receiving container is shorter than twice the width of the organic matter-receiving container.

12. The organic waste processing device as claimed in claim 1, further comprising a heating unit having one or more heating elements and configured to heat organic waste contained in the organic matter-receiving chamber via the bottom wall of the organic matter-receiving chamber and the heat gas flowing into the organic matter-receiving chamber.

13. An organic waste processing device comprising:
an organic matter-receiving container having a bottom wall and a peripheral wall extending from the bottom wall and defining together an organic matter-receiving chamber;
at least one grinding assembly at least partially contained in the organic matter-receiving chamber, each one of the at least one grinding assembly comprising:
a drive shaft having an outer peripheral surface, the drive shaft being located centrally inside an ascending gas flow channel, the drive shaft being surrounded by a partition wall spaced-apart thereof with the ascending gas flow channel extending inbetween, a descending gas flow channel surrounding the ascending gas flow channel with the partition wall extending inbetween; and
a rotatable blade assembly including a blade support sleeve mounted to said drive shaft and being engaged in rotation therewith, said blade support sleeve having a sleeve outer peripheral surface and the rotatable blade assembly further includes at least one blade mounted to the blade support sleeve and extending outwardly from said sleeve outer peripheral surface into the organic matter-receiving chamber;
said drive shaft and said blade support sleeve being in fluid communication and configured to define at least one gas path to provide gas flow flowing from the descending gas flow channel of the drive shaft into said organic matter-receiving chamber; and
a gas-propelling unit in gas communication with the ascending gas flow channel of said drive shaft;
wherein the ascending gas flow channel and the descending gas flow channel are in fluid communication above an upper free end of the partition wall, and the partition wall comprises tubular shell extending upwardly from the bottom wall of the organic matter-receiving container and preventing organic matter contained in the organic matter-receiving chamber to enter into a gas-plenum chamber.

14. The organic waste processing device as claimed in claim 13, further comprising a casing including a base and a peripheral wall, extending upwardly from the base, and defining together an internal compartment, the organic matter-receiving container being removably insertable in the internal compartment of the casing with the bottom wall of the organic matter-receiving container being spaced-apart from the base of the casing to define a define the gas-plenum chamber inbetween and in gas communication with and being located between the gas-propelling unit and the ascending gas flow channel of the drive shaft of the at least one grinding assembly.

15. The organic waste processing device as claimed in claim 13, wherein the blade support sleeve covers a section of the drive shaft extending in the organic matter-receiving chamber with an inner surface of a peripheral wall of the blade support sleeve being at least partially spaced-apart from the partition wall to define the descending gas flow channel.

16. The organic waste processing device as claimed in claim 13, wherein the at least one grinding assembly comprises more than one grinding assembly, spaced-apart from one another in the organic matter-receiving container and extending upwardly from the bottom wall of the organic matter-receiving container.

17. The organic waste processing device as claimed in claim 2, wherein the blade support sleeve is removably mounted to the drive shaft.

18. A method for grinding and drying waste organic matter, the method comprising the steps:

adding waste organic matter into an organic matter-receiving chamber; and simultaneously grinding the waste organic matter by engaging in rotation at least one grinding assembly having at least one blade mounted thereon and drying the waste organic matter while it is grinded by blowing-gas into the organic matter-receiving chamber from a gas-plenum chamber through an ascending gas flow channel and a desc das flow channel of the at least one grinding assembly, a drive shaft of the at least one blade being located centrally inside re ascending gas flow channel, a partition wall surrounding the drive shaft and being spaced-apart er with the as flow channel extending inbetween, and the descending gas flow channel surrounding the ascending gas flow channel partition wall extending inbetween, wherein the ascending gas flow channel and the descending gas flow channel are in fluid communication above an upper free end of the partition wall, and the partition wall comprise tubular shell extending upwardly from bottom wall of the organic matter-receiving chamber and preventing the organic matter contained in the organic matter-receiving chamber to enter into the gas-plenum chamber.

19. The method of claim 18, wherein the waste organic matter is heated via a bottom wall of the organic matter-receiving chamber; and the gas is heated.

\*    \*    \*    \*    \*